United States Patent
Oe et al.

(10) Patent No.: US 9,804,780 B2
(45) Date of Patent: Oct. 31, 2017

(54) STORAGE APPARATUS, METHOD OF CONTROLLING STORAGE APPARATUS, AND NON-TRANSITORY COMPUTER-READABLE STORAGE MEDIUM STORING PROGRAM FOR CONTROLLING STORAGE APPARATUS

(71) Applicant: FUJITSU LIMITED, Kawasaki-shi, Kanagawa (JP)

(72) Inventors: Kazuichi Oe, Yokohama (JP); Motoyuki Kawaba, Kawasaki (JP)

(73) Assignee: FUJITSU LIMITED, Kawasaki (JP)

( * ) Notice: Subject to any disclaimer, the term of this patent is extended or adjusted under 35 U.S.C. 154(b) by 80 days.

(21) Appl. No.: 14/532,050

(22) Filed: Nov. 4, 2014

(65) Prior Publication Data

US 2015/0134905 A1 May 14, 2015

(30) Foreign Application Priority Data

Nov. 14, 2013 (JP) .................................. 2013-235528

(51) Int. Cl.
*G06F 12/08* (2016.01)
*G06F 3/06* (2006.01)

(52) U.S. Cl.
CPC ............ *G06F 3/0608* (2013.01); *G06F 3/061* (2013.01); *G06F 3/068* (2013.01); *G06F 3/0635* (2013.01); *G06F 3/0656* (2013.01)

(58) Field of Classification Search
CPC ............ G06F 12/0246; G06F 12/0802; G06F 3/0689; G06F 12/0689
See application file for complete search history.

(56) References Cited

U.S. PATENT DOCUMENTS 5,420,998 A    5/1995  Horning
7,644,239 B2   1/2010  Ergan et al.
(Continued)

FOREIGN PATENT DOCUMENTS

JP    S61-190644 A   8/1986
JP    4-113414 A     4/1992
(Continued)

OTHER PUBLICATIONS

Japanese Office Action dated Apr. 25, 2017 for corresponding Japanese Patent Application No. 2013-235528, with English Translation, 11 pages.

*Primary Examiner* — Ryan Bertram
*Assistant Examiner* — Trang Ta
(74) *Attorney, Agent, or Firm* — Fujitsu Patent Center

(57) ABSTRACT

A storage apparatus is provided, including a first storage device; a second storage device having an access speed higher than an access speed of the first storage device; a monitor that monitors a write access load for the first storage device; a comparator that compares the write access load for the first storage device monitored by the monitor, with a load threshold; and a switch that causes write access target data to be written into the first and second storage devices, when it is determined by the comparator that the write access load for the first storage device does not exceed the load threshold, while causing the write access target data to be written into the first storage device, when it is determined by the comparator that the write access load for the first storage device exceeds the load threshold.

12 Claims, 18 Drawing Sheets

(56) References Cited

U.S. PATENT DOCUMENTS

| | | | | |
|---|---|---|---|---|
| 8,930,647 B1* | 1/2015 | Smith | ............... | G06F 9/44557 711/103 |
| 2009/0144393 A1* | 6/2009 | Kudo | ............... | G06F 9/5044 709/218 |
| 2009/0319724 A1 | 12/2009 | Oe et al. | | |
| 2010/0057984 A1* | 3/2010 | Chen | ............... | G06F 12/0804 711/113 |
| 2010/0199036 A1* | 8/2010 | Siewert | ............... | G06F 3/0613 711/112 |
| 2011/0047437 A1* | 2/2011 | Flynn | ............... | G06F 9/52 714/758 |
| 2011/0093651 A1 | 4/2011 | Kurashige | | |
| 2011/0185120 A1 | 7/2011 | Jess | | |
| 2011/0283065 A1* | 11/2011 | Kurashige | ............... | G06F 12/0804 711/118 |
| 2012/0246403 A1* | 9/2012 | McHale | ............... | G06F 3/0604 711/114 |
| 2013/0138908 A1 | 5/2013 | Iwasaki | | |
| 2014/0281265 A1* | 9/2014 | Atkisson | ............... | G06F 12/0802 711/136 |
| 2016/0132433 A1* | 5/2016 | Hayashi | ............... | G06F 12/0866 711/118 |

FOREIGN PATENT DOCUMENTS

| | | |
|---|---|---|
| JP | 06-83708 A | 3/1994 |
| JP | 2006-4407 A | 1/2006 |
| JP | 2010-2942 A | 1/2010 |
| JP | 2011-90460 A | 5/2011 |
| JP | 2011-154669 A | 8/2011 |
| JP | 2012-123551 A | 6/2012 |
| JP | 2013-504142 A | 2/2013 |
| JP | 2013-114624 A | 6/2013 |
| WO | 2011/031796 A2 | 3/2011 |

* cited by examiner

FIG. 4

| SPIKE DURATION | SAMPLED COUNT | ELAPSED TIME | | | | | | | | | | | |
|---|---|---|---|---|---|---|---|---|---|---|---|---|---|
| | | 0 | 1 | 2 | 3 | 4 | 5 | 6 | 7 | 8 | 9 | 10 | 11 | 12 |
| 1 | 907 | 907 | | | | | | | | | | | | |
| 2 | 202 | 404 | 202 | | | | | | | | | | | |
| 3 | 53 | 159 | 106 | 53 | | | | | | | | | | |
| 4 | 16 | 64 | 48 | 32 | 16 | | | | | | | | | |
| 5 | 8 | 40 | 32 | 24 | 16 | 8 | | | | | | | | |
| 6 | 7 | 42 | 35 | 28 | 21 | 14 | 7 | | | | | | | |
| 7 | 2 | 14 | 12 | 10 | 8 | 6 | 4 | 2 | | | | | | |
| 8 | 3 | 24 | 21 | 18 | 15 | 12 | 9 | 6 | 3 | | | | | |
| 13 | 1 | 13 | 12 | 11 | 10 | 9 | 8 | 7 | 6 | 5 | | | | |
| 16 | 1 | 16 | 15 | 14 | 13 | 12 | 11 | 10 | 9 | 8 | 7 | | | |
| 19 | 1 | 19 | 18 | 17 | 16 | 15 | 14 | 13 | 12 | 11 | 10 | 9 | | |
| 20 | 1 | 20 | 19 | 18 | 17 | 16 | 15 | 14 | 13 | 12 | 11 | 10 | 9 | |
| 32 | 2 | 64 | 62 | 60 | 58 | 56 | 54 | 52 | 50 | 48 | 46 | 44 | 42 | 40 |
| 37 | 1 | 37 | 36 | 35 | 34 | 33 | 32 | 31 | 30 | 29 | 28 | 27 | 26 | 25 |
| 49 | 1 | 49 | 48 | 47 | 46 | 45 | 44 | 43 | 42 | 41 | 40 | 39 | 38 | 37 |
| 89 | 1 | 89 | 88 | 87 | 86 | 85 | 84 | 83 | 82 | 81 | 80 | 79 | 78 | 77 |
| 111 | 1 | 111 | 110 | 109 | 108 | 107 | 106 | 105 | 104 | 103 | 102 | 101 | 100 | 99 |
| AVERAGE LIFE EXPECTANCY | | 1.71523 | 2.87043 | 5.68686 | 10.08686 | 13.93333 | 17.63636 | 24.4 | 27 | 33.8 | 36 | 38.625 | 41.85714 | 46.3333 |

| SSD OFFSET 221 | HDD OFFSET 222 | STATUS 223 |
|---|---|---|
| 0 | 268435456 | ALLOCATED |
| 2097152 | 306184192 | Moving(HDD->SSD) |
| 4194304 | 505413632 | Moving(SSD->HDD) |
| 6291456 | NULL | FREE |
| ⋮ | ⋮ | ⋮ |

| SEGMENT NUMBER 131 | CONTINUOUS COUNT 132 |
|---|---|
|  |  |
|  |  |
|  |  |

STORAGE APPARATUS, METHOD OF CONTROLLING STORAGE APPARATUS, AND NON-TRANSITORY COMPUTER-READABLE STORAGE MEDIUM STORING PROGRAM FOR CONTROLLING STORAGE APPARATUS

CROSS-REFERENCE TO RELATED APPLICATIONS

This application is based upon and claims the benefit of priority of the prior Japanese Patent Application No. 2013-235528, filed on Nov. 14, 2013, the entire contents of which are incorporated herein by reference.

FIELD

The present disclosure relates to a storage apparatus, a method of controlling a storage apparatus, and a non-transient computer-readable storage medium storing a program for controlling a storage apparatus.

BACKGROUND

For example, load analyses of hybrid storage systems (tiered storage systems) including hard disk drives (HDDs) and solid state drives (SSDs) have revealed that nomadic work load spikes emerge in some of the hybrid storage systems.

As used herein, the term "spike" refers to the situation where work loads (also known as loads) emerge intensively on a limited area in a storage. The term "nomadic work load spike" refers to a situation where such spikes occurs intensively for a relatively shorter time (e.g., about one to 10 minutes), and then spikes emerge in a different location (offset).

For eliminating such work loads, in addition to HDDs, hybrid storage systems are provided with an SSD as a cache, for achieving both performance improvement and cost efficiency. The scheme where an SSD is employed as a cache is referred to as the SSD cache scheme.

Examples of SSD caches include Facebook FlashCache and Fusion DirectCache.

Unfortunately, such an SSD cache scheme employs the writeback of the cache. Hence, the SSD cache scheme may cause a problem upon migrating nomadic work load spikes with higher write ratios.

Specifically, once all SSD cache blocks have been consumed, for allocating a new spike and cache block, some cache blocks need to be cleaned. For nomadic work load spikes with higher write ratios, a significant amount of writeback to HDDs occurs.

Typical SSD cache blocks have smaller sizes, e.g., 4 kilobytes (KB), and hence a writeback causes a random access to the HDD, which leads to a significant delay.

Additionally, in the writeback cache scheme, once all cache areas are exhausted, a writeback of a dirty block (a block in the SSD the content, data in which does not match the content in the corresponding block in the HDD) occurs frequently. While nomadic work load spikes with higher write ratios are executed, writeback of dirty blocks frequently occurs, which consumes significant areas that can be used by the user.

For the reasons set forth above, applying a cache SDD to work loads experiencing nomadic work load spikes with higher write ratios is often not so effective as expected.

Furthermore, since SSDs are expensive, making full use of them has been sought for achieving their effective utilization.

SUMMARY

Hence, a storage apparatus is provided, including a first storage device; a second storage device having an access speed higher than an access speed of the first storage device; a monitor that monitors a write access load for the first storage device; a comparator that compares the write access load for the first storage device monitored by the monitor, with a load threshold; and a switch that causes write access target data to be written into the first and second storage devices, when it is determined by the comparator that the write access load for the first storage device does not exceed the load threshold, while causing the write access target data to be written into the first storage device, when it is determined by the comparator that the write access load for the first storage device exceeds the load threshold.

Further, a method of controlling a storage apparatus including a first storage device, and a second storage device having an access speed higher than an access speed of the first storage device is provided, the method including monitoring a write access load for the first storage device; comparing the write access load for the first storage device monitored in the monitoring, with a load threshold; and causing write access target data to be written into the first and second storage devices, when it is determined by the comparator that the write access load for the first storage device does not exceed the load threshold, while causing the write access target data to be written into the first storage device, when it is determined by the comparator that the write access load for the first storage device exceeds the load threshold.

Furthermore, a non-transient computer-readable storage medium storing a program for controlling a storage apparatus including a first storage device, and a second storage device having an access speed higher than an access speed of the first storage device is provided, the program making a processor; monitor a write access load for the first storage device; compare the write access load for the first storage device monitored in the monitoring, with a load threshold; and cause write access target data to be written into the first and second storage devices, when it is determined by the comparator that the write access load for the first storage device does not exceed the load threshold, while causing the write access target data to be written into the first storage device, when it is determined by the comparator that the write access load for the first storage device exceeds the load threshold.

The object and advantages of the invention will be realized and attained by means of the elements and combinations particularly pointed out in the claims.

It is to be understood that both the foregoing general description and the following detailed description are exemplary and explanatory and are not restrictive of the invention, as claimed.

BRIEF DESCRIPTION OF DRAWINGS

FIG. 4 is a diagram illustrating an example of how a work load analyzer as an example of an embodiment calculates average life expectancies of work load spikes;

DESCRIPTION OF EMBODIMENTS

Hereinafter, an embodiment of a storage apparatus, a method of controlling a storage apparatus, and a non-transient computer-readable storage medium storing a program for controlling a storage apparatus in accordance with the disclosed technique will be described with reference to the drawings.

(A) Configuration

Hereinafter, a configuration of a hybrid storage system (storage system) 1 as an example of an embodiment will be described with reference to FIGS. 1 to 4.

Figure 1:
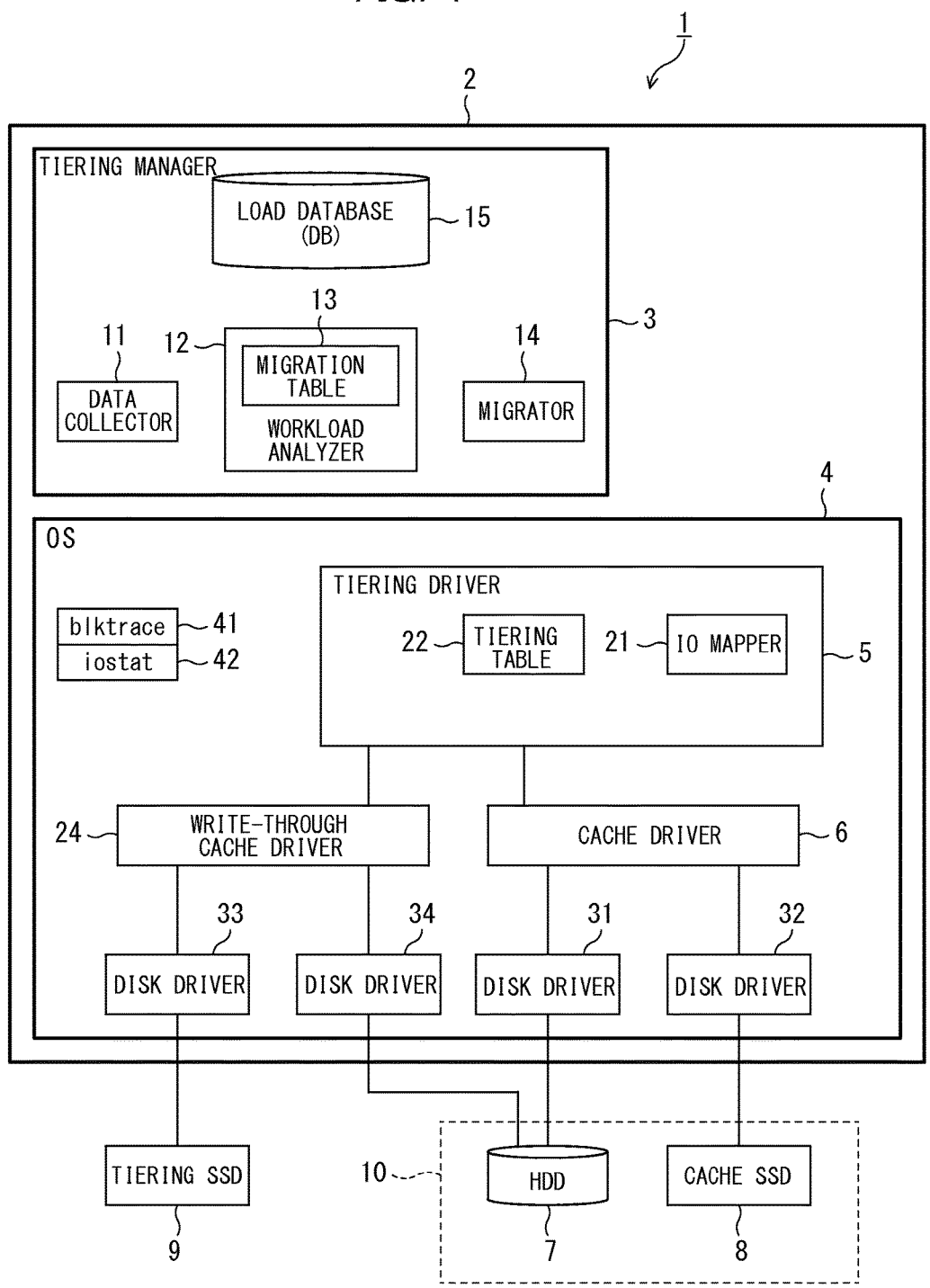
FIG. 1 is a schematic diagram illustrating a system configuration of a hybrid storage system as an example of an embodiment.
Figure 2:
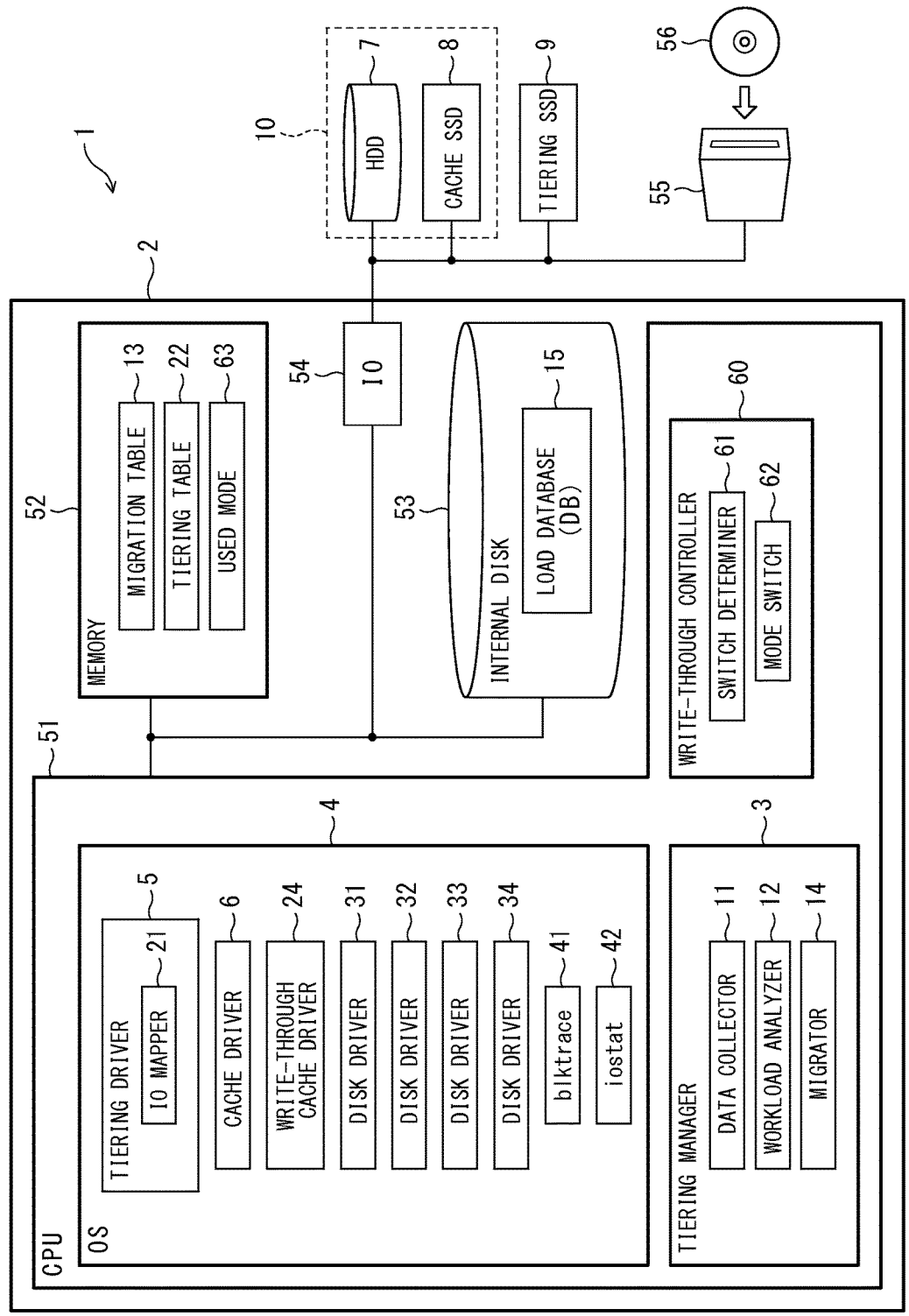
FIG. 2 is a schematic diagram illustrating functional and hardware.

FIG. 1 is a schematic diagram illustrating a system configuration of the hybrid storage system (hybrid storage system) as an example of an embodiment. FIG. 2 is a schematic diagram illustrating functional and hardware configurations of the hybrid storage system 1 as an example of an embodiment.

The hybrid storage system 1 includes an information processing apparatus 2, a HDD (first storage unit) 7, a cache SSD (third storage unit) 8, and a tiering SSD (second storage unit) 9.

In the hybrid storage system 1, if there is any nomadic work load spike that lasts for a certain time duration (e.g., 30 minutes) or longer, in a particular region (segment) the HDD 7 which will be described in detail later, data in that segment is migrated to the tiering SSD 9 which will be described in detail later, thereby improving the performance of the storage system 2.

Hereinafter, a nomadic work load spike that lasts at least for the certain time duration is referred to as a "continuous nomadic work load spike".

How frequently such continuous nomadic work load spikes occur may be varied.

Thus, in a storage region where a lot of continuous nomadic work load spikes have been observed, continuous nomadic work load spikes may be reduced significantly, due to a reduction in data accesses from higher-level apparatuses, such as hosts, for example.

On the other hand, in a storage region where continuous nomadic work load spikes have been rarely observed, a large number of continuous nomadic work load spikes may occur due to increased number of data accesses from higher-level apparatuses, for example.

Otherwise, continuous nomadic work load spikes may be alternatingly increased and reduced.

If no continuous nomadic work load spike arises, the tiering SSD 9 is not used, wasting the valuable resource of the expensive tiering SSD 9.

Hence, the hybrid storage system 1 as an example of an embodiment employs the tiering SSD 9 as a write-through cache, when no continuous nomadic work load spike arises.

Here, the term "write-through" refers to a technique wherein data that is to be written to a HDD, is written to both the HDD and a cache. A cache used for such write-through may be referred to as a "write-through cache", whereas a cache used for write-through may be referred to as a "write-through cache". In the hybrid storage system 1, the tiering SSD 9 can also be used as a write-through cache.

In the write-through scheme, no dirty block will be generated since all write data is also written to the HDD 7.

One scheme alternative to the write-through scheme is write-back. In the write-back scheme, data that is to be ultimately written to a HDD, is temporarily written to a cache (write-back cache), and the data is then written from the cache the HDD. A cache used for write-back is referred to as a "write-back cache". In the hybrid storage system 1, the cache SSD 8 is used as such a write-back cache.

The information processing apparatus 2 is a computer having a server function, for example, and sends and receives a wide variety of types of data, such as SCSI commands and responses, from and to the HDD 7 and the cache SSD 8, which will be described later, using a storage connection protocol. The information processing apparatus 2 writes and reads data to and from storage areas provided by the HDD 7 and the cache SSD 8, by sending disk access commands, such as read and write commands, to the HDD 7 and the cache SSD 8.

The HDD 7 is a storage drive including disks having magnetic materials applied thereon, as a recording medium, wherein, by moving a magnetic head, information is read and written from and to the disks rotating at a high speed.

The cache SSD 8 is a storage drive including a semiconductor memory as a recording medium, and is also referred to as a silicon disk drive or a semiconductor disk drive. Generally, the cache SSD 8 enables faster random accesses than those of the HDD 7, since the cache SSD 8 does not take head seek time for moving the magnetic head, unlike the HDD 7. The cache SSD 8 is more expensive than the HDD 7 since it has a semiconductor memory device.

As set forth above, the cache SSD 8 is used as a writeback cache for the HDD 7. Hence, the cache SSD 8 will be also referred to as the "write-back cache SSD 8".

In the present embodiment, the HDD 7 and the cache SSD 8 behave as a single disk. Specifically, pieces of data in the HDD 7, which are frequently accessed by the tiered storage apparatus 1, are placed in the cache SSD 8 having a higher access speed. In other words, the cache SSD 8 is used as a cache of the HDD 7. For this reason, thereinafter, the HDD 7 and the cache SSD 8 are collectively referred to as a flush cache 10, or simply as a cache 10. Alternatively, the HDD 7 and the cache SSD 8 can be reckoned as a single HDD 10, and may be referred to as a HDD 10.

Note that techniques for using the cache SSD 8 as a cache of the HDD 7 are well known in the art, and thus the descriptions therefor are omitted there.

The tiering SSD 9 is a storage drive including a semiconductor memory as a recording medium, and is also referred to as a silicon disk drive or a semiconductor disk drive. Generally, the tiering SSD 9 enables faster random accesses than those of the HDD 7, since the tiering SSD 9 does not take head seek time for moving the magnetic head, unlike the HDD 7. The tiering SSD 9 is more expensive than the HDD 7 since it has a semiconductor memory device.

The tiering SSD 9 has two operation modes: a tiering cache mode (also referred to as a "tiered mode") and a write-through cache mode.

Figure 3:
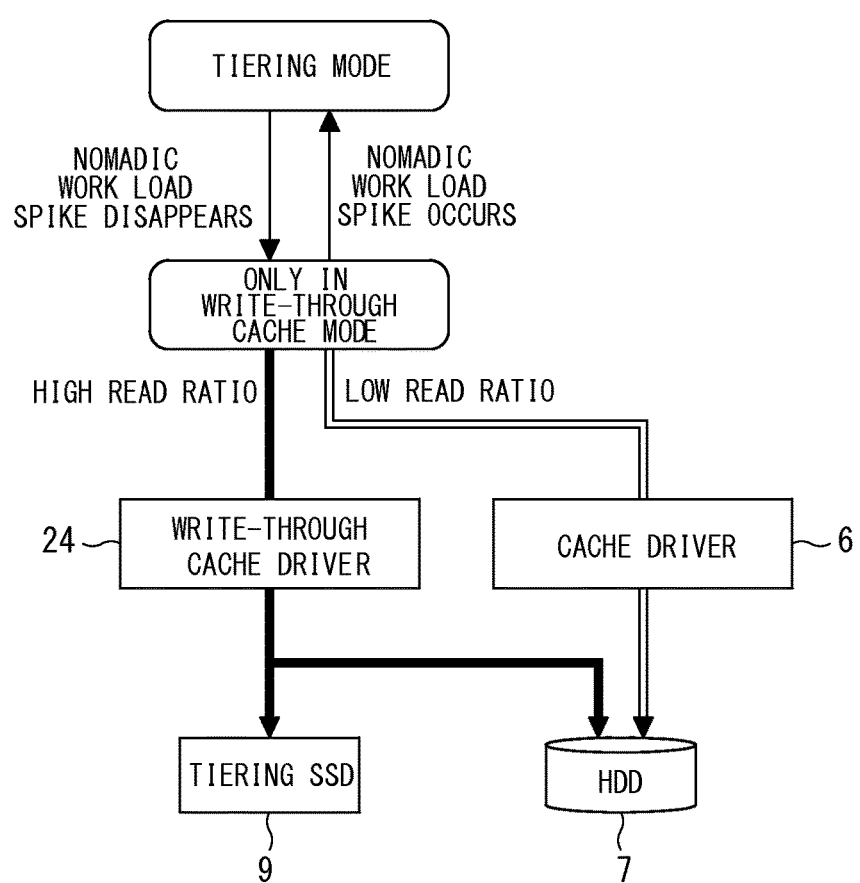
FIG. 3 is a diagram illustrating a write-through cache mode and a tiering cache mode of a tiering SSD in the hybrid storage system as an example of an embodiment.

FIG. 3 is a diagram illustrating the write-through cache mode and the tiering cache mode of the tiering SSD 9 in the hybrid storage system 1 as an example of an embodiment.

In the HDD 10, when any continuous nomadic work load spike is detected by the tiering manager 3 which will be described later, the tiering SSD 9 is set to the tiering cache mode (see the "tiered mode" in FIG. 3). In this mode, under the control of the cache driver 6 which will be described later, data, a write of which is instructed in a write IO from a higher-level apparatus, is written to either the flush cache 10 (HDD 10) or the tiering SSD 9.

That is, in the tiering cache mode, data in a storage region (segment) experiencing a nomadic work load spike is migrated from the HDD 7 to the tiering SSD 9. Thereafter, when any further write IO is issued to the segment, the data of which has been migrated the tiering SSD 9, instructed data is written to the corresponding segment in the tiering SSD 9. When the nomadic work load spike in the segment disappears, the data is written from the tiering SSD 9 to the HDD 7.

Alternatively, in the case where no nomadic work load spike has arisen, when a write IO to a segment in the HDD 7 is requested, data of which has not been migrated to the tiering SSD 9, the data is written to that segment in the HDD 7.

When the tiering manager 3 detects that a continuous nomadic work load spike that was registered in the HDD 10 disappears, the tiering SSD 9 is set to the write-through cache mode. In this mode, IOs to a segment where the ratio of the read to all IOs is a certain value or higher (e.g., segment where the read ratio is 80% or greater) is routed to the write-through cache driver 24 which will be described later. For example, data, a write of which is instructed in a write IO from a higher-level apparatus, is written to both the flush cache 10 (HDD 10) and the tiering SSD 9 under the control of the write-through cache driver 24. In contrast, IOs to a segment where the ratio of read to all IOs is low is routed to the cache driver 6 which will be described later. For example, data which is instructed to be written to a segment with a low read ratio in a write IO, is written to both the HDD 7 under the control of the cache driver 6.

The operation modes for the tiering SSD 9 is switched by a mode switch 62 in a write-through controller 60 which will be described later with reference to FIG. 2.

When switching the operation mode, the mode switch 62 stores information indicating the current operation mode of the tiering SSD 9, in the memory 52 (see FIG. 2), which will be described later, as a use mode 63 (see FIG. 2). For example, the mode switch 62 sets a value wt-cache to the use mode 63 when the tiering SSD 9 is in the write-through cache mode, while setting a value tiering when the tiering SSD 9 is in the cache mode.

As depicted in FIG. 2, the information processing apparatus 2 includes a central processing unit (CPU) 51, a memory 52, an internal disk 53, an input/output (I/O) interface 54, and a media reader 55, for example.

The CPU 51 runs an operating system (OS) 4, which is system software for providing basic functions of the information processing apparatus 2. The CPU 51 executes various types of processing by running programs stored in the memory 52.

The memory 52 stores various kinds of programs and data executed by the CPU 51, and data generated during the operation of the CPU 51. The memory 52 also functions as a storing unit that stores a migration table 13 and a tiering table 22, which will be described later. The memory 52 may be any of a wide variety of known memory devices, such as a random access memory, a read only memory (ROM), a non-volatile memory, and a volatile memory. Further, the memory 52 may include multiple types of memory devices.

The internal disk 53 is a disk drive providing a storage area internal to the information processing apparatus 2, and stores the OS 4 and a wide variety of programs to be executed by the information processing apparatus 2, for example. The internal disk 53 is a HDD, for example. The internal disk 53 also functions as a storage unit that stores a load database (DB, dataset) 15, which will be described later.

The I/O interface 54 is an adaptor that connects the information processing apparatus 2, the HDD 7, the cache SSD 8, and the tiering SSD 9. The I/O interface 54 is a disk interface compliant with the Serial Advanced Technology Attachment (SATA), Small Computer System Interface (SCSI), Serial Attached SCSI (SAS), or Fibre Channel (FC) standard, for example.

The media reader 55 is a drive for a reading a recording medium 56, such as CD-ROMs and DVD-ROMs, and is a CD-ROM or DVD-ROM drive, for example.

The CPU 51 runs the OS 4.

The OS 4 is system software that implements basic functions, such as hardware managements for the information processing apparatus 2. The OS 4 is Linux®, for example.

The OS 4 includes a tiering driver 5, a cache driver 6, disk drivers 31 to 33, the blktrace command 41, and the iostat command 42.

The cache driver 6 is also referred to as a flush cache driver, and controls the disk driver 31 and the disk driver 32 for embodying the cache system of the flush cache 10 defined by the HDD 7 and the cache SSD 8. Hence, the cache driver 6 may also be referred to as the "write-back cache driver 6".

The write-through cache driver 24 controls the disk driver 33 and the disk driver 34 such that the tiering SSD 9 is used as a write-through cache mode, when the tiering SSD 9 is in the write-through cache mode.

The disk driver 31 is a device driver that controls the hardware of the HDD 7.

The disk driver 32 is a device driver that controls the hardware of the cache SSD 8.

The disk driver 33 is a device driver that controls the hardware of the tiering SSD 9.

The disk driver 34 is a device driver that controls the hardware of the HDD 7 when the tiering SSD 9 is in the write-through cache mode.

The tiering driver 5 controls data migration (transfer) between the flush cache 10 defined by the HDD 7 and the cache SSD 8, and the tiering SSD 9, in a unit of segments, as will be described later.

As depicted in FIG. 1, the tiering driver 5 includes an IO mapper 21 and a tiering table 22.

The IO mapper 21 instructs data migration (transfer) in a unit of segments, to the cache driver 6 and the disk driver 33 by looking up the tiering table 22, which will be described later.

The tiering table 22 is stored in the memory 52. The tiering table 22 is a table describing the relationship between the flush cache (HDD) 10 and the tiering SSD 9. The detailed configuration of the tiering table 22 which will be described later with reference to FIG. 10.

The blktrace command 41 depicted in FIGS. 1 and 2 is used to trace the block IO layer. The blktrace command 41 traces the statuses of an IO request in the entry and exit of a block IO layer, and inside the block IO layer. The product of the trace is an IO trace.

The data collector 11, which will be described later, executes the blktrace command periodically (e.g., at one minute interval), and accumulates an IO trace in a load database 15.

For example, on the Linux OS, the data collector 11 measures, for each fixed-size section in the storage volume (hereinafter, such a section will be referred as a segment), the following: 1) the IO count; 2) the ratio per IO size; 3) the ratio of read/write; and 4) the histogram of responses, and stores the results in the load database 15.

Note that the locations of segments in the HDD 10 are designated using offsets in the HDD 10, and thus segments may be referred to as "offset ranges".

The iostat command 42 is used to obtain IO statistics information, and the option "-x" provides information, including the busy ratio for each disk (% util, % util of near 100 indicates that the disk is approaching its performance limit).

% util indicates that ratio of the current performance of a disk to the peak performance.

The CPU 51 (refer to FIG. 2) in the tiered storage controller 1 functions as a tiering manager (tiered storage controller) 3 and a write-through controller 60, by executing a program (not illustrated).

The tiering manager 3 identifies segments hit by nomadic work load spike(s), i.e., segments where work loads have relatively longer duration time (e.g., three minutes or longer), in the flush cache 10 defined by the HDD 7 and the cache SSD 8, in real time. The tiering manager 3 then instructs migration of the identified segments (more precisely, data stored in those segments) from the HDD 10 to the tiering SSD 9.

The tiering manager 3 includes a data collector (collector) 11, a work load analyzer (analyzer) 12, and a migrator 14.

The data collector 11 executes the blktrace command 41 periodically in a predetermined interval to collect statistics of each segment, such as IO counts, in real time, and stores the collected statistics in the load database (load information) 15.

As an example, the flush cache 10 has a 4.4-tera byte (TB) capacity, the segment size is 1 GB, and the predetermined interval (time slice) is one minute. In this case, the data collector 11 collects IO counts for 4400 segments every minute, and stores the results in the load database 15.

Note that particular operations by the data collector 11 will be described later with reference to FIG. 12.

The work load analyzer 12 identifies segments hit by nomadic work load spike(s), based on data in the load database 15 collected by the data collector 11.

Here, the work load analyzer 12 detects work loads that have relatively longer duration time, as nomadic work load spikes. The work load analyzer 12 uses average life expectancies of work loads, as their duration time, for identifying nomadic work load spikes. As used herein, the term "average life expectancy" is a duration time of a work load minus the lapse time of that work load.

Specifically, a system administrator may collect duration time of nomadic work load spikes (work loads) in the hybrid storage system 1 in advance, and the duration time of the nomadic work load spikes is calculated from the collected duration time using a known calculation technique. Note that techniques for calculating average life expectancies are well known and the description therefor will be omitted.

Here, with reference to FIG. 4, an example of how to calculate average life expectancies of work load spikes will be described.

FIG. 4 is a diagram illustrating an example of how the work load analyzer 12 as an example of an embodiment calculates average life expectancies of work load spikes.

Firstly, a system administrator or any other use obtains duration time and sampled count (occurrence frequency) of work load spikes for a certain time period (e.g., last six hours).

Next, for work load spike, a median value is calculated by subtracting the elapsed time from the duration time of that work load spike and multiplying the resulting value with the sampled count. For example, as depicted in FIG. 4, for the work load spike of which duration time, sampled count, and elapsed time are 5, 3, and 8, respectively, the median value is calculated as: $(5-3) \times 8 = 16$. The median values for the other work load spikes are calculated in the similar manner.

Next, an average life expectancy for a certain point in time (elapsed time) is calculated by dividing the sum of median values by the sum of sampled counts, at that point in time.

In the example in FIG. 4, at the point in time (elapsed time) of three minutes, the sum of median values is calculated as Sum B, and the sum of the sampled counts is calculated as Sum A. Thereafter, an average life expectancy of 10.08699 minutes is determined by divided Sum B by Sum A. In this case, the average life expectancy of a work load spike that lasts for three minutes is expected to be about ten minutes, meaning that this work load spike is expected to last for ten minutes at the point in time (elapsed time) of three minutes.

Figure 5:
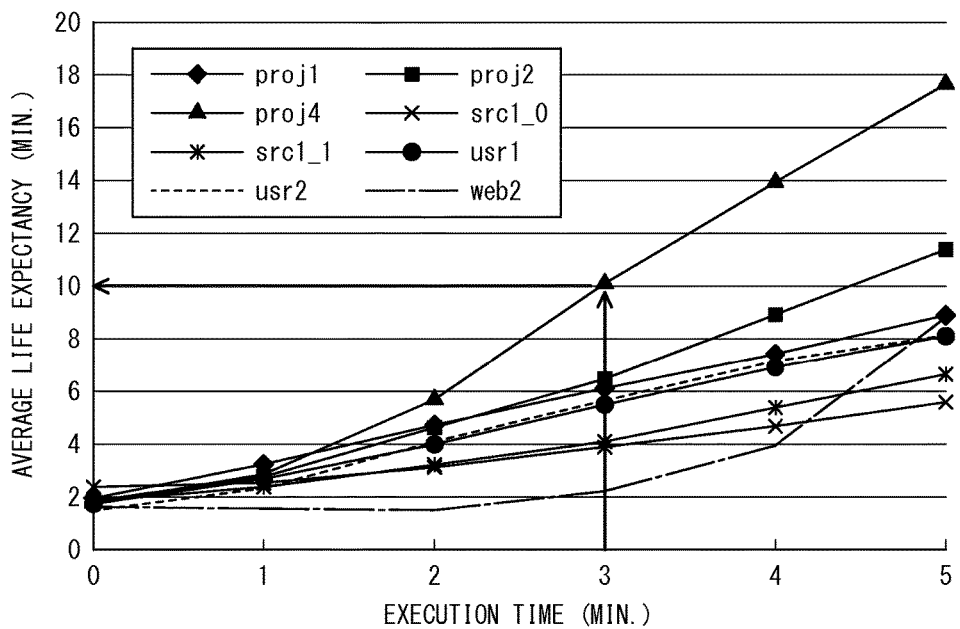
FIG. 5 is a graph illustrating exemplary average life expectancies of work load spikes calculated by the work load analyzer as an example of an embodiment.

Exemplary average life expectancies of work load spikes calculated using the above technique is plotted in FIG. 5.

FIG. 5 is a graph illustrating exemplary average life expectancies of work load spikes calculated by the work load analyzer 12 as an example of an embodiment.

In this figure, the average life expectancies of eight work loads (proj1, proj2, . . . ) are calculated.

The horizontal axis represents the execution time (duration time) of each work load, while the vertical axis represents the life expectancy of the work load at the execution time.

In the example in FIG. 5, proj4 is expected to around last two minutes immediately after this work load is detected, while the work load may last ten minutes when the work load continues for three minutes.

In this manner, the work load analyzer 12 determines whether a work load is a continuous nomadic work load spike or not, based on average life expectancies determined. The work load analyzer 12 then speculatively migrates a work load spike that is determined as a continuous nomadic work load spike, to the tiering SSD 9.

Figure 6:
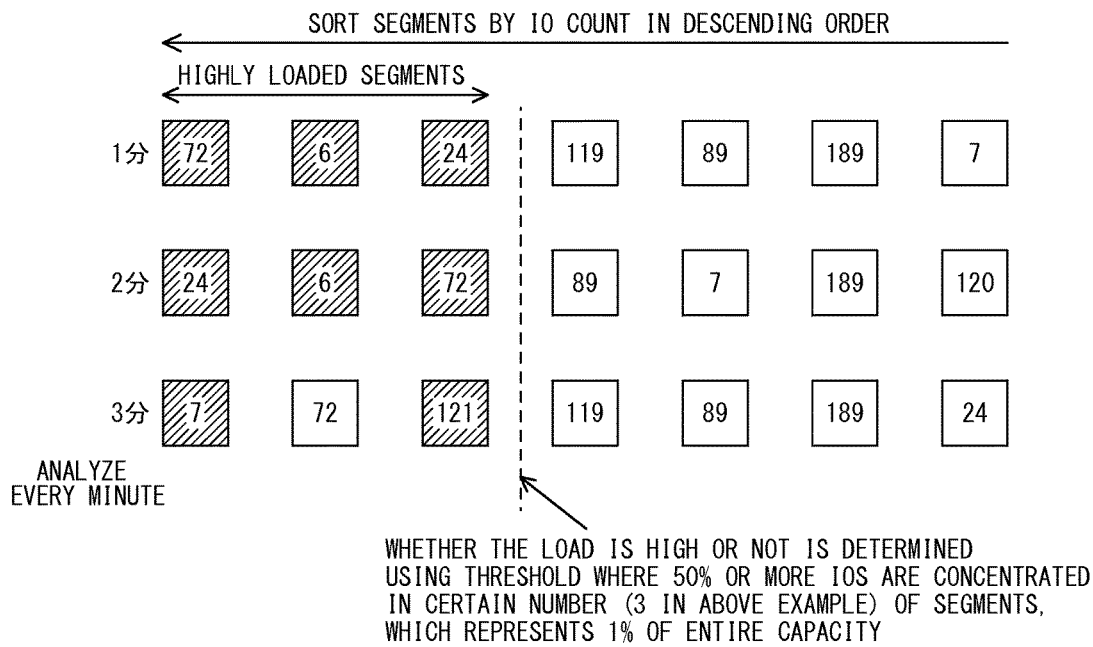
FIG. 6 is a diagram illustrating an example of how the work load analyzer as an example of an embodiment identifies nomadic work load spikes.

FIG. 6 is a diagram illustrating an example of how the work load analyzer 12 as an example of an embodiment identifies nomadic work load spikes.

As depicted in FIG. 6, the work load analyzer 12 obtains, from the load database 15, data of which is collected by the data collector 11, the count of IOs (IO count) for each segment in the flush cache 10 (the HDD 10) for each time duration (e.g., one minute). The work load analyzer 12 then sorts the segments in the HDD 10 in the descending order of the IO count. The work load analyzer 12 then identifies any work load spike having an IO count that has satisfied a high-load criteria for N minutes (three minutes in the example in FIG. 6), as a continuous nomadic work load spike.

Here, the term "high-load criteria" refers to the number of segments wherein 50% or more of all IOs to such segments in the HDD 10 account for 1% of the entire capacity of the HDD 10. In the example in FIG. 6, the high-load criteria is three segment. In this case, if a certain work load spike has fallen within the top-3 segments of the IO count for three consecutive times, the work load spike is considered as lasting for three minutes. In this case, the work load analyzer 12 determines this work load spike as a continuous work load spike.

The work load analyzer 12 compares the 10 minutes against the cost (time) for tiered migration (staging) of that nomadic work load spike (i.e., the sum of detection overhead and the stating time), and executes a tiered migration if the 10 minutes are more costly.

In other words, in response to detecting a nomadic work load spike that last for a certain time (e.g., three minutes), as indicated by Formula (3) described later, the work load analyzer 12 determines the cost (time) for a tiered migration based on the segment count, and compares that cost (time) against the average life expectancy depicted in FIG. 4.

In other words, in response to detecting a nomadic work load spike that last for a certain time (e.g., three minutes), as indicated by Formula (3) described later, the work load analyzer 12 determines the cost (time) for a tiered migration based on the segment count, and compares that cost (time) against the average life expectancy depicted in FIG. 11.

When the work load analyzer 12 determines that the average life expectancy exceeds the cost (time) for a tiered migration, the work load analyzer 12 selects that segment hit by that nomadic work load spike as a candidate segment (hereinafter, such a segment is referred to as a migration candidate segment or tiered migration candidate segment). The work load analyzer 12 then writes details of the candidate segment to be migrated, into a migration table 13.

The detailed operations of the work load analyzer 12 will be described with reference to FIGS. 13 and 14.

The migrator 14 instructs the tiering driver 5 to migrate a segment from the tiering SSD 9 to the flush cache 10, or vice versa, based on an instruction from the work load analyzer 12.

The detailed operations of the migrator 14 will be described with reference to FIG. 17.

In response to the work load analyzer 12 detecting occurrence or elimination of a continuous nomadic work load spike in the HDD 10, the write-through controller 60 (FIG. 2) switches the operation mode of the tiering SSD 9 between a write-through cache mode and a tiering cache mode.

The write-through controller 60 includes a switch determinator (comparator) 61 and a mode switch (switch) 62.

The switch determinator 61 determines the current operation mode of the tiering SSD 9, based on the value of the use mode 63 stored in the memory 52. When the mode of the tiering SSD 9 is the tiering cache mode, the switch determinator 61 determines whether there is any segment to be migrated to the tiering SSD 9 (hereinafter, such a segment will be referred to as s "tiering SSD 9 migration candidate segment"), and whether there is any segment that is marked as to be migrated to the tiering SSD 9 is in the migration table 13 (hereinafter, such a segments will be referred to as a "tiering SSD 9 migration marked segment"). Based on these determinations, the switch determinator 61 determines whether or not the operation mode of the tiering SSD 9 is required.

Based on the determination made by the switch determinator 61 related to whether the operation mode of the tiering SSD 9 is to be switched or not, the mode switch 62 switches the mode of the tiering SSD 9 between the write-through cache mode and the tiering cache mode.

Here, with reference to FIGS. 7 to 9, transitions among operation modes of the tiering SSD 9 will be described.

Figure 7:
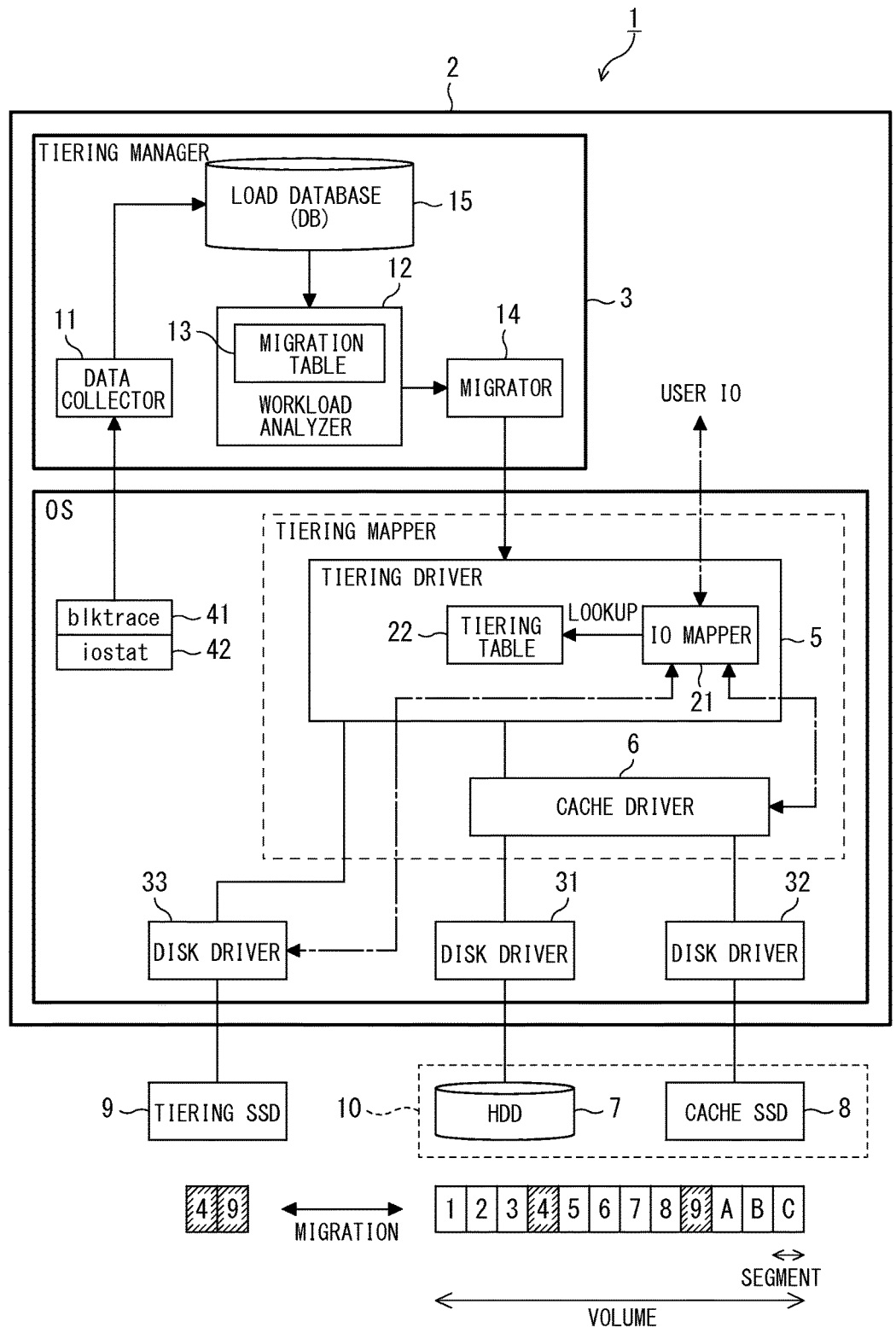
FIG. 7 is a diagram illustrating the hybrid storage system as an example of an embodiment when the tiering SSD is in the tiering cache mode.

FIG. 7 is a diagram illustrating the hybrid storage system as an example of an embodiment when the tiering SSD 9 is in the tiering cache mode.

When the tiering SSD 9 is in the tiering cache mode, in the example in FIG. 7, the work load analyzer 12 determines that a nomadic work load spike occurs in Segments 4 and 9 in the HDD 10, using the load database 15. The migrator 14 then migrates data in Segments 4 and 9 in the HDD 10, to the tiering SSD 9.

Thereafter, if no nomadic work load spike has not been detected by the work load analyzer 12 in Segments 4 and 9 in the HDD 10 for a certain time duration (e.g., 30 minutes), the operation mode of the tiering SSD 9 is switched from the tiering cache mode to the write-through cache mode.

Figure 8:
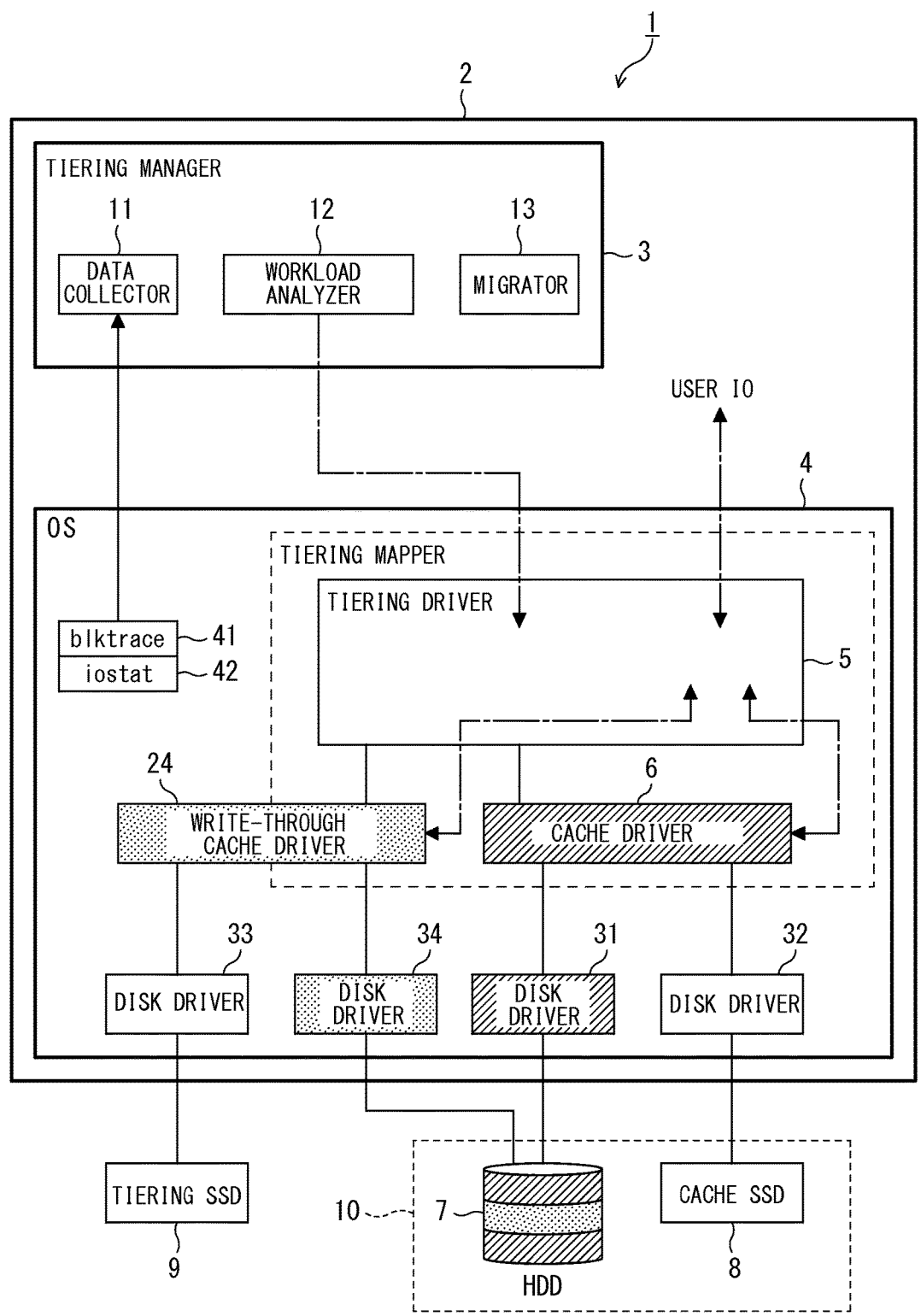
FIG. 8 a diagram illustrating the hybrid storage system as an example of an embodiment when the tiering SSD is in the write-through cache mode.

Upon the switching, as depicted in FIG. 8, the mode switch 62 (see FIG. 2) formats storage regions in the tiering SSD 9 in a format suited for a write-through cache. The mode switch 62 then installs the OS 4 into the write-through cache driver 24 and incorporates it under the tiering driver 5.

FIG. 8 a diagram illustrating the hybrid storage system as an example of an embodiment when the tiering SSD 9 is in the write-through cache mode.

When the tiering SSD 9 is in write-through cache mode, the work load analyzer 12 identifies any segment in the HDD 10 where a load with a high read ratio is observed and notifies the tiering driver 5 of the identified segment. The notified tiering driver 5 routes IOs to the segment in the HDD 10 notified by the work load analyzer 12, to the write-through cache driver 24.

Figure 9:
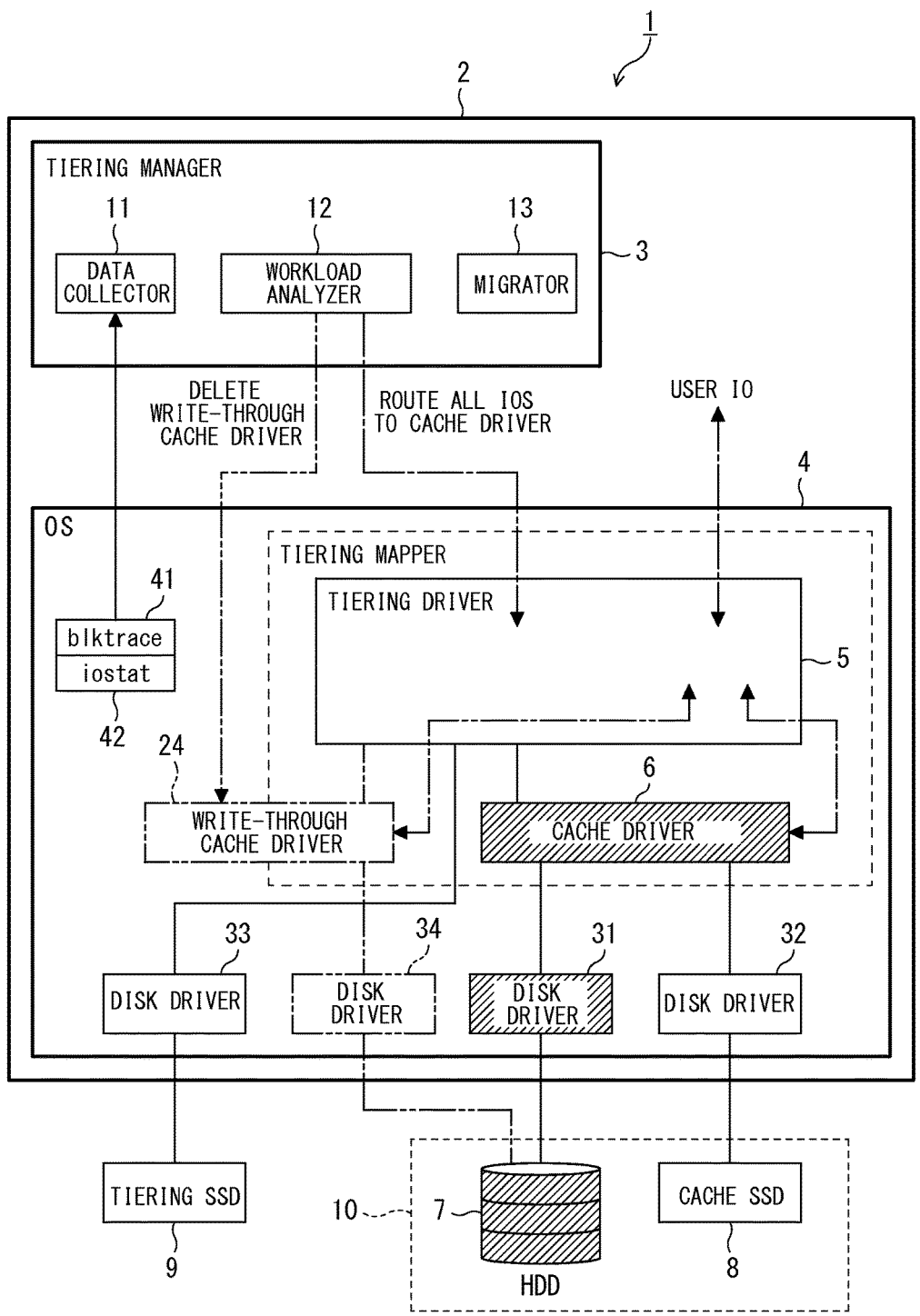
FIG. 9 is a diagram illustrating switching the tiering SSD as an example of an embodiment, from the write-through cache mode to the tiering cache mode.

In the write-through cache mode, if the work load analyzer 12 detects any continuous nomadic work load spike in the HDD 10, as depicted in FIG. 9, the mode switch 62 (see FIG. 2) switches the tiering SSD 9 to the tiering cache mode.

FIG. 9 is a diagram illustrating switching the tiering SSD 9 as an example of an embodiment, from the write-through cache mode to the tiering cache mode.

In this case, the mode switch 62 instructs the tiering driver 5 to switch the tiering SSD 9 to the tiering cache mode. In response to the instruction, the tiering driver 5 routes all IOs to the HDD 10, to the cache driver 6.

The mode switch 62 then deletes the write-through cache driver 24 for connecting the tiering driver 5 directly to the tiering SSD 9, thereby putting the tiering SSD 9 in the tiering cache mode.

Detailed operations of the switch determinator 61 and the mode switch 62 will be described later with reference to FIG. 15.

Figures 10, 11, 12:
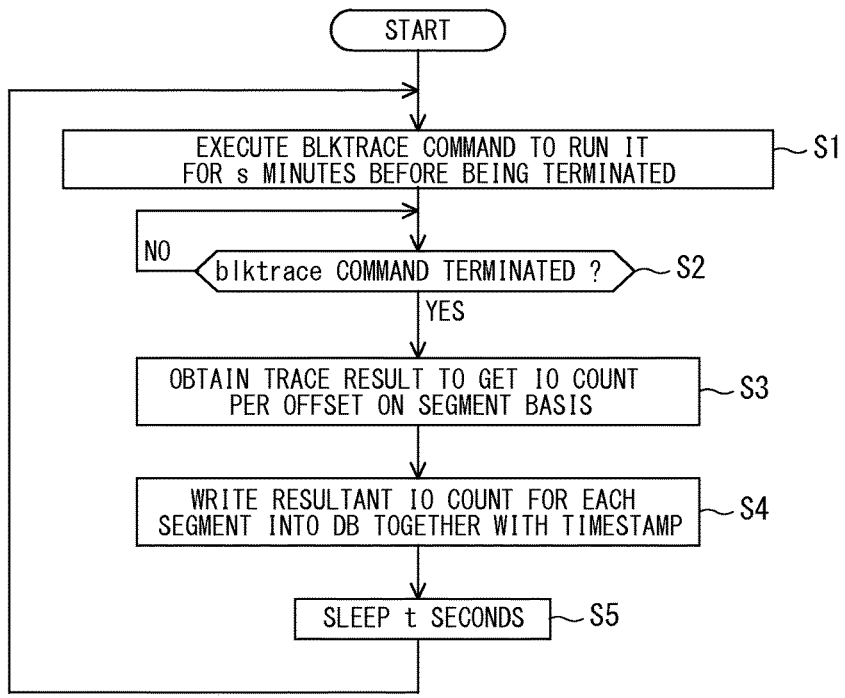
FIG. 10 is a diagram illustrating an example of a tiering table used in the hybrid storage system as one example of an embodiment.
FIG. 11 is a diagram illustrating an example of a tiering table used in the hybrid storage system as one example of an embodiment.
FIG. 12 is a flow chart illustrating a data collection by a data collector in the hybrid storage system as an example of an embodiment.

FIG. 10 is a diagram illustrating an example of a tiering table 22 used in the hybrid storage system 1 as one example of an embodiment.

In the example depicted in FIG. 10, the tiering table 22 stores SSD offsets 221, and related offsets 222 in the HDD 10 and statuses 223.

Each SSD offset 221 indicates the location of a segment data, data in which has been migrated to the tiering SSD 9, as the offset for that segment in the tiering SSD 9. For example, the offset may be a logical block address (LBA) of that segment in the tiering SSD 9.

Each HDD offset 222 indicates the original location of a segment in the flush cache 10, data, data in which has been migrated to the tiering SSD 9 indicated by the SSD offset 221, as the offset for that segment in the flush cache 10. For example, the offset may be a logical block address (LBA) of that segment in the flush cache 10. Here, the flush cache 10 is reckoned as a single HDD 10, and an offset in the flush cache 10 is referred to as an "offset in the HDD 10".

Each status 223 stores information indicating the status of a segment data of which has been migrated to the tiering SSD 9, indicated by the SSD offset 221. The status 223 takes one of the following values: "Free" indicating that the tiering SSD 9 has free space; "Allocated" indicating that an area is allocated for the tiering SSD 9 but data is not migrated yet; and "Moving" indicating that data has been migrated between the HDD 10 and the tiering SSD 9. The "Moving" has two values: "Moving (HDD->SSD)" indicating that the data has been migrated from the HDD 10 to the tiering SSD 9, and "Moving (SSD->HDD)" indicating that the data has been migrated vice versa.

Next, the structure of the migration table 13 will be described.

FIG. 11 is a diagram illustrating an example of the tiering table 13 used in the hybrid storage system 1 as one example of an embodiment.

The migration table 13 includes segment numbers 131 and continuous counts 132, as depicted in FIG. 4.

Each segment number 131 indicates a number of a segment which is determined to be migrated to the tiering SSD 9.

Each continuous count 132 indicates how many times the segment has been determined continuously that segment is hit by a nomadic work load spike.

If the count that the segment which has been staged the tiering SSD 9 is not determined continuously that that segment is hit by a nomadic work load spike is less than a certain time out value, the work load analyzer 12 instructs a write-back of that segment from the tiering SSD 9 to the flush cache 10.

Note that, in the embodiment set forth above, the CPU 51 in the information processing apparatus 2 functions as the tiering manager 3, the data collector 11, the work load analyzer 12, and the migrator 14, the write-through controller 60, the switch determinator 61, and the mode switch 62 in FIGS. 1 and 2, by executing a storage control program.

Note that the program (storage control program) for implementing the functions as the tiering manager 3, the data collector 11, the work load analyzer 12, and the migrator 14, the write-through controller 60, the switch determinator 61, and the mode switch 62 are provided in the form of programs recorded on a computer read able recording medium, such as, for example, a flexible disk, a CD (e.g., CD-ROM, CD-R, CD-RW), a DVD (e.g., DVD-ROM, DVD-RAM, DVD-R, DVD+R, DVD-RW, DVD+RW, HD-DVD), a Blu Ray disk, a magnetic disk, an optical disk, a magneto-optical disk, or the like. The computer then reads a program from that storage medium 56 and uses that program after transferring it to the internal storage apparatus or external storage apparatus or the like. Alternatively, the program may be recoded on a storage unit (storage medium 56), for example, a magnetic disk, an optical disk, a magneto-optical disk, or the like, and the program may be provided from the storage unit to the computer through a communication path Upon embodying the functions as the migrator 14, the write-through controller 60, the switch determinator 61, and the mode switch 62, programs stored in internal storage apparatuses (the memory 25 in the information processing apparatus 2) are executed by a microprocessor of the computer (the CPU 51 in the information processing apparatus 2 in this embodiment). In this case, the computer may alternatively read a program stored in the storage medium 56 via the media reader 55 for executing it.

Note that, in this embodiment, the term "computer" may be a concept including hardware and an operating system, and may refer to hardware that operates under the control of the operating system, for example. Alternatively, when an application program alone can make the hardware to be operated without requiring an operating system, the hardware itself may represent a computer. The hardware includes at least a microprocessor, e.g., CPU, and a means for reading a computer program recorded on a storage medium 56 and, in this embodiment, the information processing apparatus 2 includes a function as a computer.

(B) Functions and Operations

Hereinafter, the functions and the operations of the hybrid storage system 1 as an example of an embodiment will be described with reference to the drawings.

Now referring to FIG. 12, operations by the data collector 11 will be described.

FIG. 12 is a flow chart (Steps S 1 to S 5) illustrating a data collection by the data collector 11 in the hybrid storage system 1 as an example of an embodiment.

In Step S 1, the data collector 11 initiates the blktrace command 41, specifying the condition in that the blktrace command 41 is executed for "s" seconds (e.g., 60 seconds).

Then in Step S 2, the data collector 11 determines whether "s" seconds elapses and the blktrace command 41 is terminated.

If the blktrace command 41 is not terminated (refer to the NO route from Step S 2), the flow returns to Step S 2.

Otherwise, if the blktrace command 41 is terminated (refer to the YES route from Step S 2), in Step S 3, the data collector 11 checks the trace result obtained through the blktrace command 41 and determines the IO count for each offset in a unit of fixed-size segment (e.g., in a unit of 1-GB segment).

Then in Step S 4, the data collector 11 writes the IO counts determined in Step S 3 into the load database 15, together with the current time stamp.

Finally in Step S 5, after sleeping for "t" seconds (e.g., 60 seconds), the data collector 11 returns to Step S 1.

Next, referring to FIGS. 6 and 7, operations by the work load analyzer 12 and the migrator 14 will be described.

Figure 13:
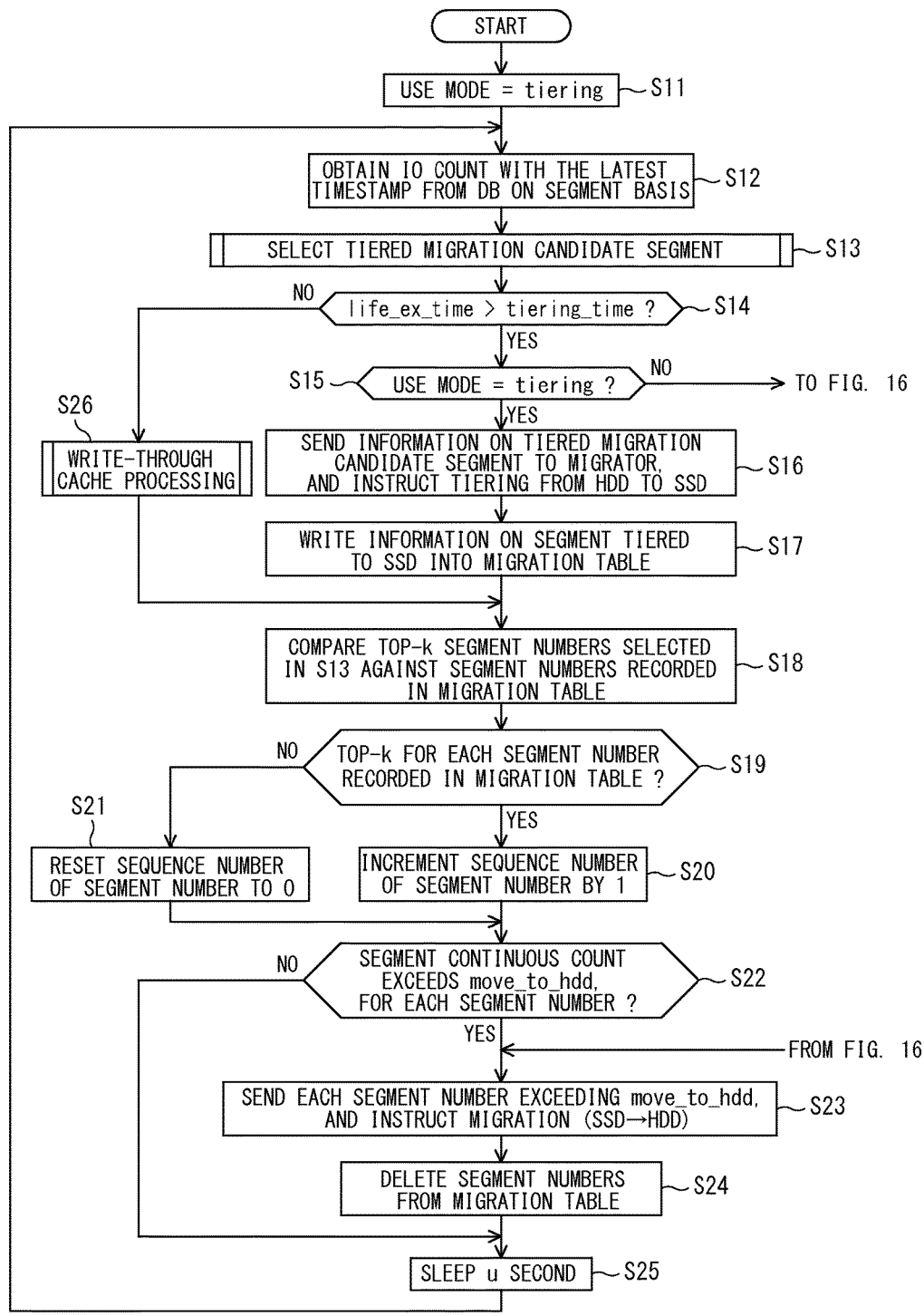
FIG. 13 is a flow chart summering a migration by a work load analyzer and a migrator in the hybrid storage system as an example of an embodiment.

FIG. 13 is a flow chart (Steps S 11 to S 25) summering a migration by the work load analyzer 12 and the migrator 14 in the hybrid storage system 1 as an example of an embodiment. FIG. 14 is a flow chart (Steps S 131 to S 141) illustrating an extraction of a migration candidate segment by the work load analyzer 12 depicted in FIG. 13.

First, in Step S 11 in FIG. 13, the mode switch 62 sets the use mode 63 to tiering, thereby setting the tiering SSD 9 to the tiering cache mode.

Next in Step S 12, the work load analyzer 12 obtains the IO counts with the latest time stamp for each segment from the load database 15.

Next, in Step S 13, the work load analyzer 12 identifies tiered migration candidate segment(s). How the segment is obtained will now be described with reference made to FIG. 14.

Figure 14:
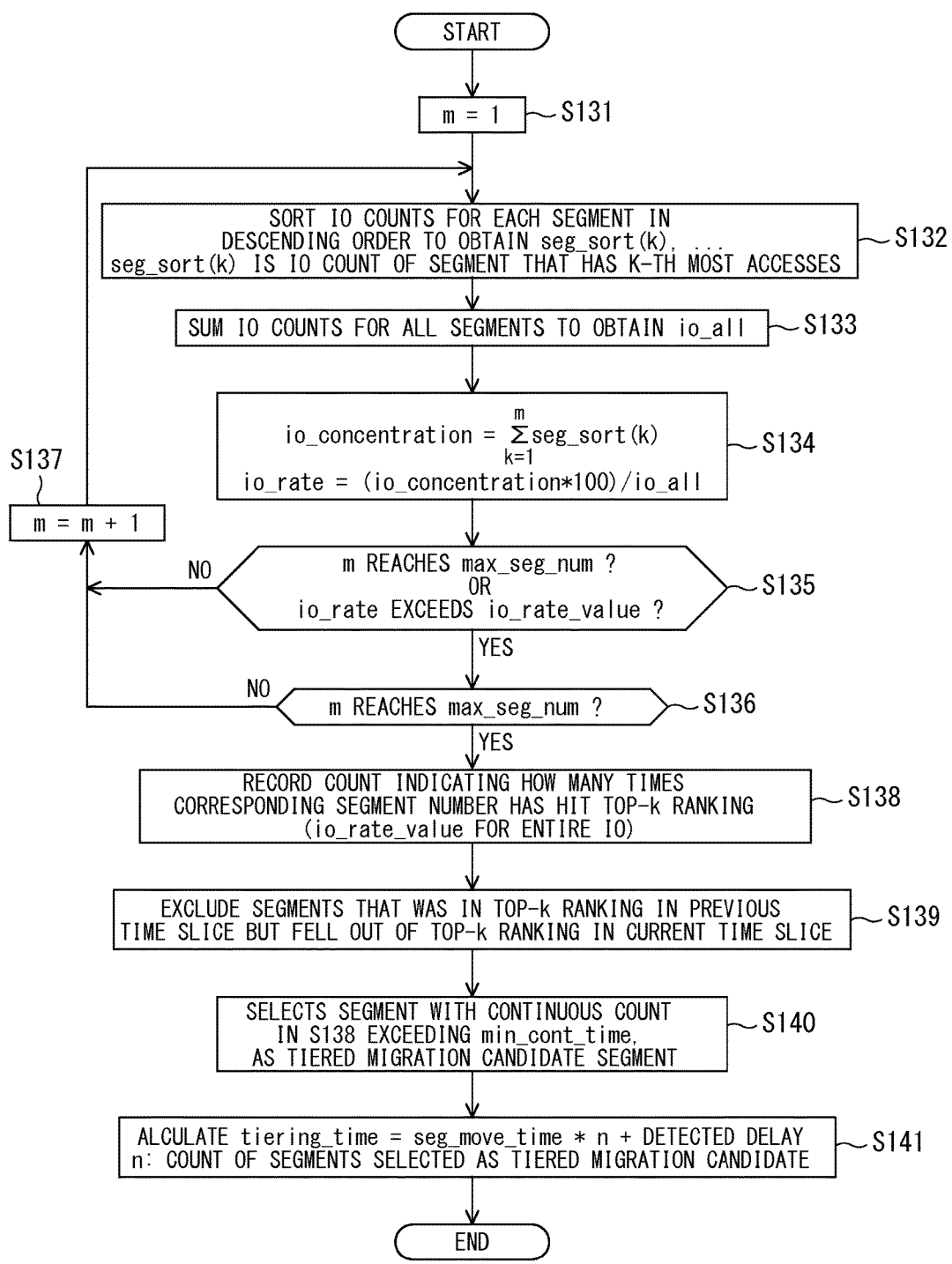
FIG. 14 is a flow chart illustrating an extraction of a migration candidate segment by the work load analyzer depicted in FIG. 13.

Firstly, in Step S 131 in FIG. 14, the work load analyzer 12 sets a variable m to its initial value of 1. The variable m is used to determine the count of segments which reaches the threshold IO rate for determining as a spike (io_rate_value).

Next, in Step S 132, the work load analyzer 12 sorts the IO counts for each segment obtained in Step S 11 in FIG. 13 in the descending order to obtain an array seg_sort (1), seg_sort (2), . . . , seg_sort (k), . . . . Here, seg_sort (k) is the IO count of the segment that has the k-th most accesses.

Next, in Step S 133, the work load analyzer 12 sums the IO counts for all segments to obtain io_all. Specifically, io_all is the total IO count at the time slice in interest.

Next, in Step S 134, the work load analyzer 12 executes calculations for seg_sort (1), seg_sort (2), . . . , seg_sort (k), . . . , using the following Eqs. (1) and (2):

$$\text{io\_concentration} = \sum_{k=1}^{m} \text{seg\_sort}(k) \quad (1)$$

$$\text{io\_rate} = (\text{io\_concentration} \times 100)/\text{io\_all} \quad (2)$$

In Step S 135, the work load analyzer 12 determines whether m reaches the maximum segment count allowed for simultaneous tiering (max_seg_num), or whether io_rate exceeds the IO rate threshold for determining as a spike (io_rate_value).

If m reaches max_seg_num, or io_rate exceeds io_rate_value (refer to the YES route from Step S 135), in Step S 136, the work load analyzer 12 determines whether m reaches max_seg_num. If m reaches max_seg_num (refer to the YES route from Step S 136), in Step S 138, the work load analyzer 12 records the count indicating how many times the corresponding segment number has hit the top-k ranking (io_rate_value for the entire IOs (%)).

Next, in Step S 139, the work load analyzer 12 excludes segments that was in the top-k ranking in the previous time slice but fell out of the top-k ranking in the current time slice.

In Step S 140, the work load analyzer 12 selects the segments of which continuous counts determined in Step S 138 exceeds min_cont_time, as tiered migration candidate segments. Here, min_cont_time is a threshold for selecting tiered migration candidate segments, and when a spike in a segment lasts exceeding this threshold, the segment is selected as a tiering migration candidate segment.

In Step S 141, the work load analyzer 12 calculates tiering_time for n segments selected as tiering migration candidates as follows:

$$\text{tiering\_time} = \text{seg\_move\_time} * n + \text{detected delay} \quad (3)$$

In the above Eq. (3), seg_move_time is the value (in seconds) representing the cost (time) of migrating a single segment from the HDD 10 to the tiering SSD 9, and is 10 seconds, for example. The detected delay is a delay time (in seconds) for migrating a segment.

If m does not reach max_seg_num and io_rate does not exceed io_rate_value (refer to the NO routes from Step S 135 and S 126), in Step S 137, m is incremented by one (+1). Thereafter, the flow returns to Step S 132.

Referring back to FIG. 13, in Step S 14, the work load analyzer 12 determines whether the average life expectancy of the spike (life_ex_time) exceeds tiering_time. Here, the value of life_ex_time varies for each work load, and is determined and set in the information processing apparatus 2 in advance, by a system administrator, for example.

If life_ex_time exceeds tiering_time (refer to the YES route from Step S 14), in Step S 15, the switch determinator 61 determines whether or not the use mode 63 (see FIG. 2) is set to tiering.

If the use mode 63 is not set to tiering (refer to the NO route from Step S 15), the tiering SSD 9 is in the write-through cache mode. Hence, the flow moves to FIG. 16 which will be described later, where the mode is switched to the tiering cache mode.

Otherwise, if the use mode 63 is set to tiering (refer to the YES route from Step S 15), the tiering SSD 9 is currently in the tiering cache mode. Hence, in Step S 16, the work load analyzer 12 instructs the migrator 14 to migrate data in the tiered migration candidate segments, from the HDD 10 to the tiering SSD 9. In response, the migrator 14 migrates data in the instructed tiered migration candidate segments from the HDD 10 to the tiering SSD 9.

Then in Step S 17, the work load analyzer 12 records information about the segments migrated to the tiering SSD 9, into the migration table 13 in the work load analyzer 12.

Otherwise, if life_ex_time does not exceed tiering_time in Step S 14 (refer to the NO route from Step S 14), the flow moves to Step S 26, where write-through cache processing is executed, and the flow then transitions to Step S 18. The write-through cache processing will be described later with reference to FIG. 15.

Next, in Step S 18, the work load analyzer 12 compares the segment numbers of the segments ranked within top k in Step S 12 against segment numbers recorded in the migration table 13.

Next, in Step S 19, the work load analyzer 12 determines whether, for each segment number recorded in the migration table 13, that segment is in the top-k ranking.

If the segment is in the top-k ranking (refer to the YES route from Step S 19), in Step S 20, the work load analyzer 12 increments the segment continuous count for that segment by one.

Otherwise, if the segment is not in the top-k ranking (refer to the NO route from Step S 19), in Step S 21, the work load analyzer 12 resets the segment continuous count to '0'.

Next, in Step S 22, the work load analyzer 12 determines whether the segment continuous count exceeds move_to_hdd, for each segment number recorded in the migration table 13. Note that move_to_hdd is a threshold for selecting a segment for moving back from the tiering SSD 9 to the HDD 10, and a segment is determined to be moved back if that segment is out of the top-k ranking.

If the segment continuous count exceeds move_to_hdd (refer to the YES route from Step S 22), in Step S 23, the work load analyzer 12 instructs the migrator 14 to migrate each segment number exceeding move_to_hdd, from the tiering SSD 9 to the HDD 7.

Then in Step S 24, the work load analyzer 12 deletes the segment numbers from the migration table 13.

Otherwise, if the segment continuous count does not exceed move_to_hdd (refer to the NO route from Step S 22), the flow returns to Step S 25.

Next in Step S 25, after sleeping u seconds (e.g., 60 seconds), the work load analyzer 12 returns to Step S 12.

The thresholds used in the flows in FIGS. 13 and 14 (e.g., max_seg_num, io_rate_value, min_cont_time, seg_move_time, life_ex_time, move_to_hdd) are set in the information processing apparatus 2 in advance, for example. The values may be factory set, or may be set by a user. The thresholds may also be varied by the user later.

Next, the write-through cache processing by the write-through controller 60 will be described.

Figure 15:
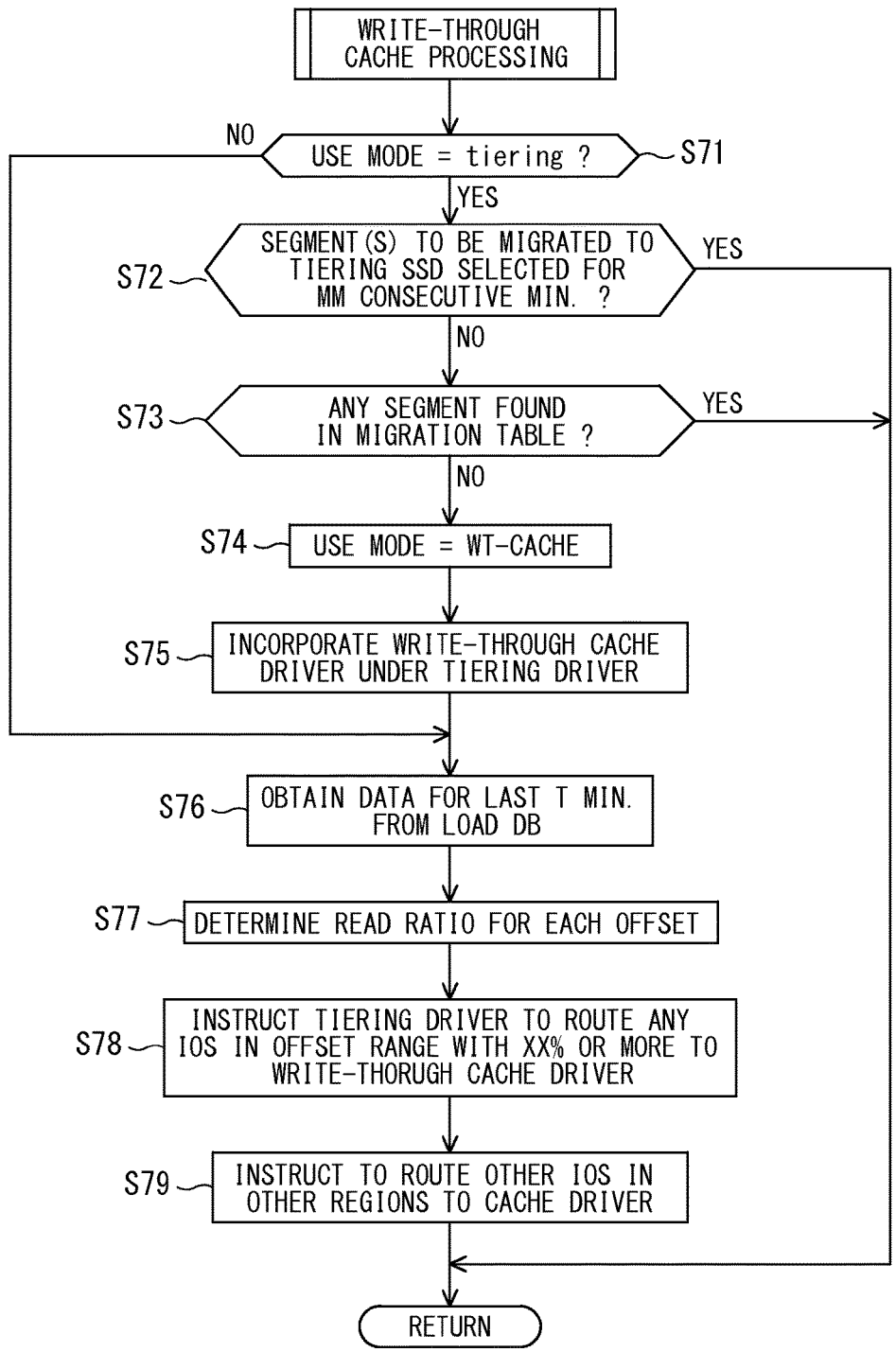
FIG. 15 is a flow chart illustrating write-through cache processing by a write-through controller in the hybrid storage system as an example of an embodiment.

FIG. 15 is a flow chart (Steps S71 to S79) illustrating write-through cache processing by a write-through controller 60 in the hybrid storage system 1 as an example of an embodiment.

In Step S 71, the switch determinator 61 in the write-through controller 60 determines whether or not the use mode 63 (see FIG. 2) is set to tiering.

If the use mode 63 is not set to tiering (refer to the NO route from Step S 71), the tiering SSD 9 is currently in the write-through cache mode. The flow thus transitions to FIG. 15, which will be described later.

Otherwise, if the use mode 63 is set to tiering (refer to the YES route from Step S 71), in Step S 72, the switch determinator 61 determines whether or not any segment to be migrated to the tiering SSD 9 has been continuously detected for MM minutes (e.g., 30 minutes).

If a tiering SSD 9 migration candidate segment has been detected for MM minutes (refer to the YES route from Step S 72), a continuous nomadic work load spike occurs and the tiering SSD 9 is still to be operated in the tiering cache mode. The write-through controller 60 thus terminates the write-through cache processing, and the flow transitions to the above-described Step S 18 in FIG. 13.

Otherwise, if no tiering SSD 9 migration candidate segment has been detected for MM minutes (refer to the NO route from Step S 72), in Step S 73, the switch determinator 61 determines whether or not any tiering SSD 9 migration marked segment is found in the migration table 13. Particularly, if there is no segment that is marked as to be migrated to the tiering SSD 9, the switch determinator 61 determines that no tiering SSD 9 migration marked segment is found in the migration table 13.

If there is any tiering SSD 9 migration marked segment is found in the migration table 13 (refer to the YES route from Step S 73), the tiering SSD 9 is still to be operated in the tiering cache mode. Hence, the write-through controller 60 terminates the write-through cache processing, and the flow transitions to the above-described Step S 18 in FIG. 13.

Otherwise, no tiering SSD 9 migration marked segment is found in the migration table 13 (refer to the NO route from Step S 73), the tiering SSD 9 can be used as a write-through cache. Hence, in Step S 74, the mode switch 62 sets the use mode 63 (see FIG. 2) to wt-cache.

Next, in Step S 75, the mode switch 62 executes the insmod command, for example, to install the OS 4 into the write-through cache driver 24. The mode switch 62 then incorporates the write-through cache driver 24 that is installed under the tiering driver 5.

Next, in Step S 76, the switch determinator 61 extracts data of IOs for the last t minutes, from the load database 15.

In Step S 77, the switch determinator 61 determines the ratio of reads to all IOs (reads and writes) (the ratio is referred to as the "read ratio"), for each offset in the HDD 10, based on the IO data extracted in Step S 76 from the load database 15.

In Step S 78, the switch determinator 61 identifies any segment in the HDD 10 where the read ratio in that segment calculated in Step S 77 is XX % (e.g., 80%) or higher. The mode switch 62 then instructs the tiering driver 5 to route (load) IOs to the segment with a read ratio of XX % higher, to the write-through cache driver 24.

In Step S 79, the mode switch 62 instructs the tiering driver 5 to route (load) IOs to segments other than the segment indicated in Step S 78, to the cache driver.

The flow then returns to Step S 18 in FIG. 13.

Figure 16:
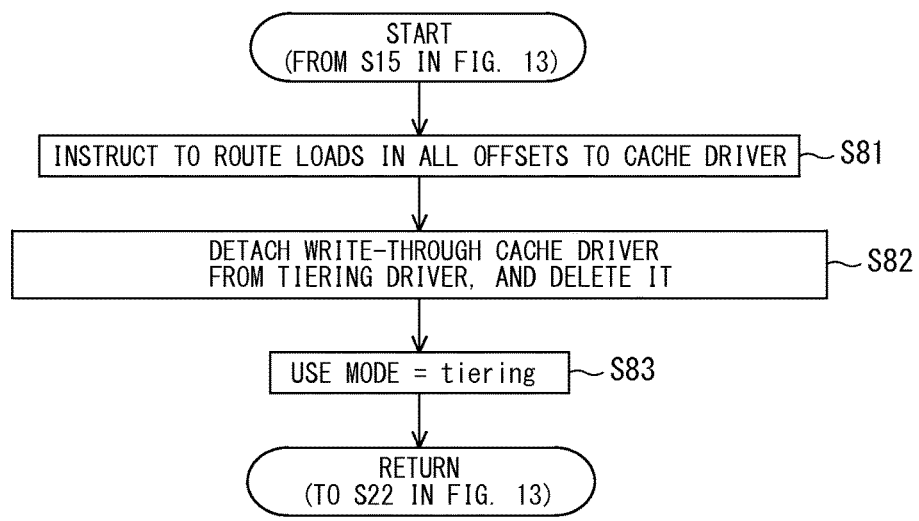
FIG. 16 is a flow chart illustrating switching by a mode switch in the hybrid storage system as an example of an embodiment.

FIG. 16 is a flow chart (Steps S81 to S83) illustrating switching by the mode switch 62 in the hybrid storage system 1 as an example of an embodiment.

In Step S 81, the mode switch 62 instructs the tiering driver 5 to route (load) IOs to all segments, to the cache driver 6.

Next, in Step S 82, the mode switch 62 detaches the write-through cache driver 24 from the tiering driver 5, and deletes the write-through cache driver 24 from the OS 4 (e.g., by executing the rmmod command).

In Step S83, the mode switch 62 sets the use mode 63 (see FIG. 2) to tiering. The flow then returns to Step S 23 in FIG. 13.

Figure 17:
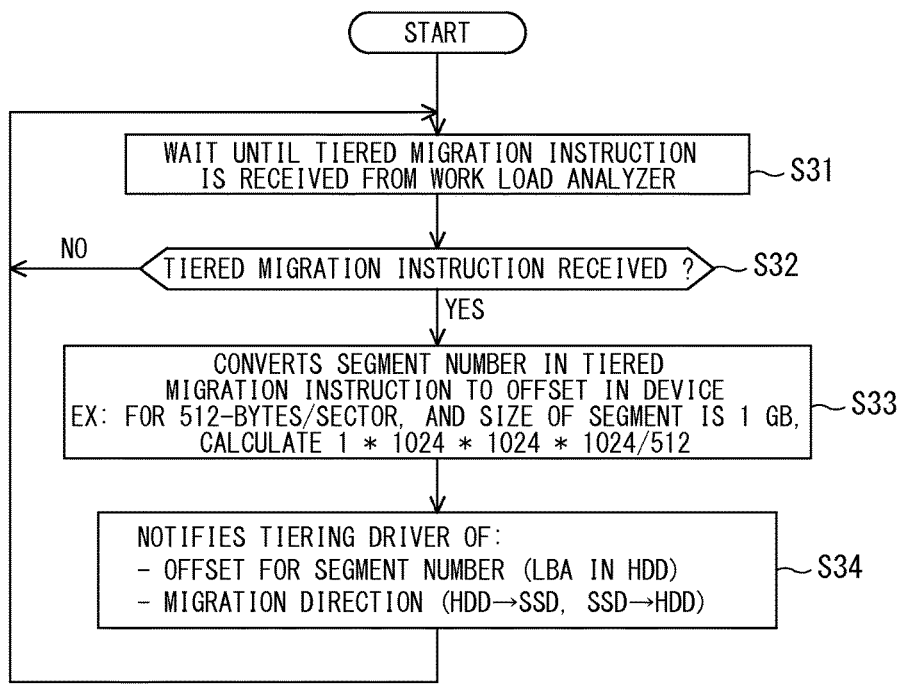
FIG. 17 is a flow chart illustrating a migration of a segment by the migrator in the hybrid storage system as an example of an embodiment.

Next, referring to FIG. 17, a migration by the migrator 14 is described.

FIG. 17 is a flow chart (Steps S 31 to S 34) illustrating a migration of a segment by the migrator 14 in the hybrid storage system 1 as an example of an embodiment.

In Step S 31, the migrator 14 waits until a tiered migration instruction is received from the work load analyzer 12.

In Step S 32, the migrator 14 determines whether a tiered migration instruction is received from the work load analyzer 12.

If a tiered migration instruction is received (refer to the YES route from Step S 32), in Step S 33, the migrator 14 converts the segment number specified the tiered migration instruction received from the work load analyzer 12, to an offset in the HDD 10 (LBA).

For example, for a 512-bytes/sector, the size of a single segment is 1 GB, the migrator 14 calculates the offset by 1*1024*1024*1024/512.

Next, in Step S 34, the migrator 14 notifies the tiering driver 5 of the offset related to the (LBA in the HDD 10) and the migration direction (from the HDD 10 to the tiering SSD 9, or from the tiering SSD 9 to the HDD 10). In response, the tiering driver 5 migrates the segment based on the information. The flow then returns to Step S 31.

If no tiered migration instruction has been received in Step S32 (refer to the NO route from Step S 32), the migrator 14 returns to Step S 31 where it waits until a tiered migration instruction is received.

Next, referring to FIG. 18, a migration of a segment by the tiering driver 5 will be described.

Figure 18:
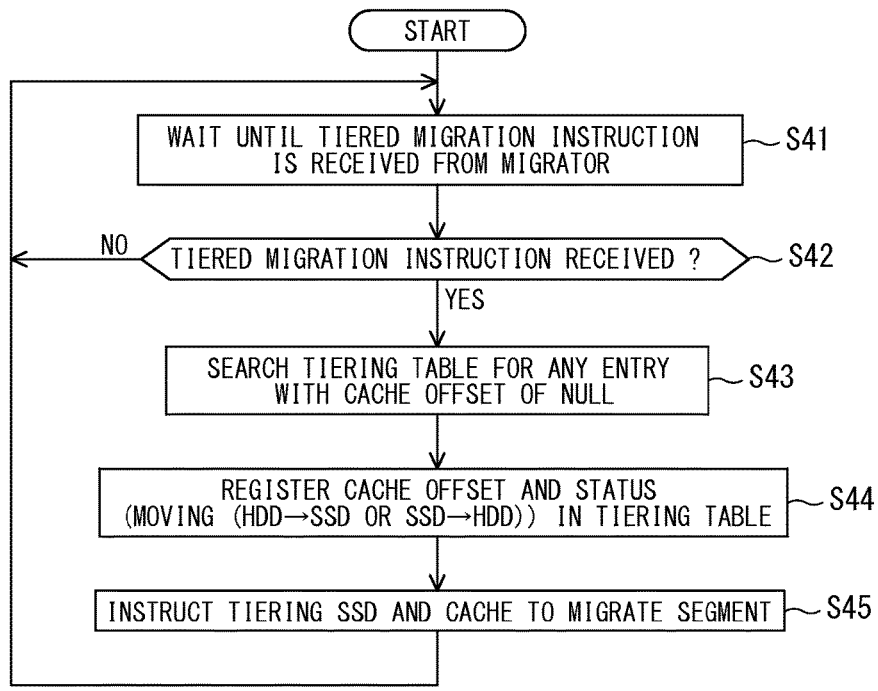
FIG. 18 is a flow chart illustrating processing by a tiering driver in the hybrid storage system as an example of an embodiment, after the segment is migrated.

FIG. 18 is a flow chart (Steps S 41 to S 45) illustrating a migration of a segment by the tiering driver 5 in the hybrid storage system 41 as an example of an embodiment.

In Step S 41, the tiering driver 5 waits until a tiered migration instruction is received from the migrator 14.

In Step S 42, the tiering driver 5 determines whether a tiered migration instruction is received from the migrator 4.

If a tiered migration instruction is received (refer to the YES route from Step S 42), in Step S 43, the tiering driver 5 searches the tiering table 22 for any entry with a HDD offset 222 of NULL.

Next, in Step S 44, the tiering driver 5 registers, in the found NULL entry, the HDD offset 222 information and status (Moving (HDD->SSD or SSD->HDD)), in the tiering table 22.

Finally in Step S 45, the tiering driver 5 instructs the tiering SSD 9 and the cache 10 to migrate the segment. Specifically, the IO mapper 21 in the tiering driver 5 instructs the cache driver 6 and the disk driver 33 to migrate the segment. The flow then returns to Step S 41.

Otherwise, if no tiered migration instruction has been received in Step S 42 (refer to the NO route from Step S 42), the tiering driver 5 returns to Step S 41 where it waits until a tiered migration instruction is received.

Next, processing by the tiering driver 5 after a segment is migrated will be described.

Figure 19:
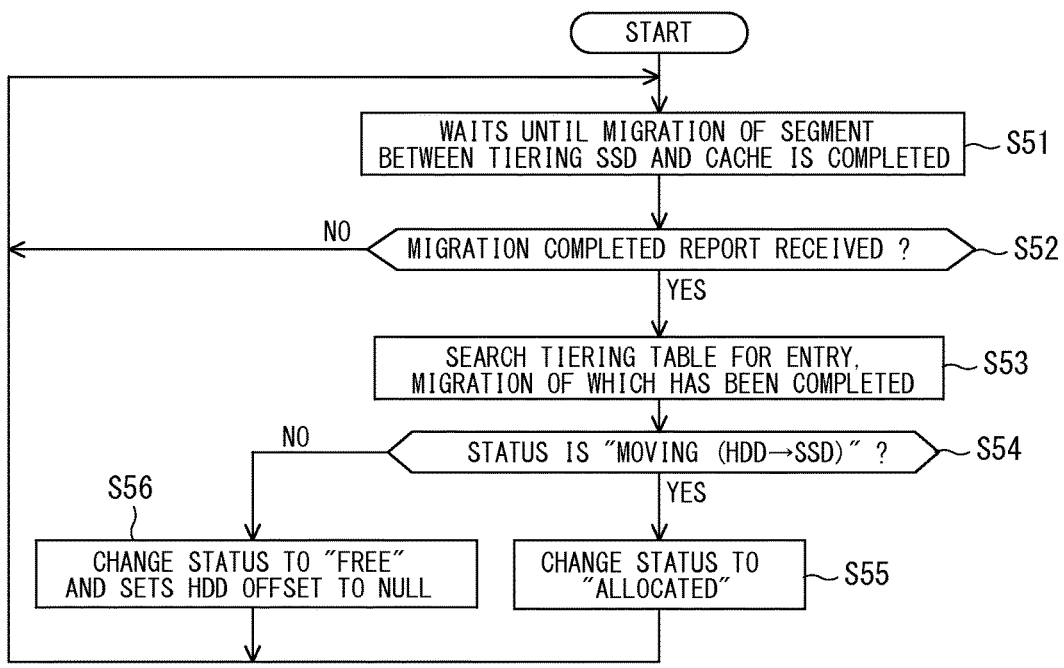
FIG. 19 is a flow chart illustrating a migration of a segment by the tiering driver in the hybrid storage system as an example of an embodiment.

FIG. 19 is a flow chart (Steps S 51 to S 56) illustrating processing by a tiering driver in the hybrid storage system as an example of an embodiment, after the segment is migrated;

In Step S 51, the tiering driver 5 waits until a migration of a segment between the tiering SSD 9 and the cache 10 is completed.

In Step S 52, the tiering driver 5 determines whether a migration completed report is received.

If a migration completed report is received (refer to the YES route from Step S 52), in Step S 53, the tiering driver 5 searches the tiering table 22 for any entry, the migration of which has been completed.

Next, in Step S 54, the tiering driver 5 determines whether the status of the found entry (if any) is "Moving (HDD->SSD)".

If the status is "Moving (HDD->SSD)" (refer to the YES route from Step S 54), in Step S 55, the tiering driver 5 changes the status of that entry to "Allocated". The flow then returns to Step S 51.

Otherwise, if the status is not "Moving (HDD->SSD)" (refer to the NO route from Step S 54), in Step S 56, the tiering driver 5 changes the status of that entry to "Free" and sets a value of NULL to the corresponding HDD offset 222. The flow returns to Step S 51.

Otherwise, if no migration completed report has been received in Step S52 (refer to the NO route from Steps S52), the tiering driver 5 returns to Step S 51 where it waits until a migration completed report is received.

Next, processing of a user IO by the tiering driver 5 after a segment is migrated will be described.

Figure 20:
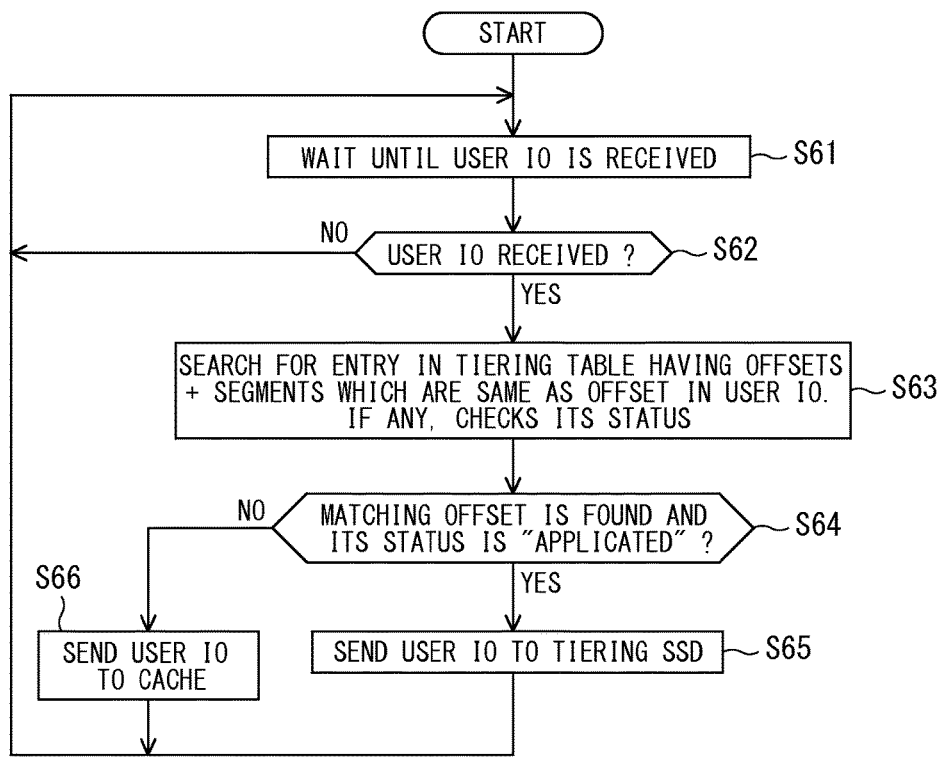
FIG. 20 is a flow chart illustrating processing of a user IO by the tiering driver in the hybrid storage system as an example of an embodiment.

FIG. 20 is a flow chart (Steps S 61 to S 66) illustrating processing of a user IP by a tiering driver in the hybrid storage system as an example of an embodiment, after the segment is migrated;

In Step S 61, the tiering driver 5 waits until a user IO is received. The user IO specifies the offset in the HDD 7 and size of data requested in the user IO, the type of the requested IO (read or write), and the like.

In Step S 62, the tiering driver 5 determines whether a user IO is received.

If a user IO is received (refer to the YES route from Step S 62), in Step S 63, the tiering driver 5 checks all entries in the tiering table 22. Specifically, the tiering driver 5 checks whether there is any entry in the tiering table 22 having offsets 221 and 222 and a segments which are the same as the offset and segment size specified in the user IO. If any, the tiering driver 5 then checks whether the status 223 of that entry is "Allocated".

If a matched entry is found and the status 223 of that entry is "Allocated" (refer to the YES route from Step S 64), the data requested in the user IO is in the tiering SSD 9. Thus, in Step S 65, the tiering driver 5 sends the user IO to tiering SSD 9. Specifically, the IO mapper 21 in the tiering driver 5 instructs the disk driver 33 to handle the user IO. Thereafter, the flow returns to Step S 61.

Otherwise, if no match is found, or if an entry is found but its status 223 is not "Allocated" (refer to the NO route from Step S 64), the data requested in the user IO is in the cached storage (HDD) 10. Therefore, in Step S 66, the tiering driver 5 sends the user IO to the cached storage 10. Specifically, the IO mapper 21 in the tiering driver 5 instructs the cache driver 6 to handle the user IO. The flow returns to Step S 61.

Otherwise, if no user IO has been received in Step S62 (refer to the NO route from Step S 62), the tiering driver 5 returns to Step S 61 where it waits until a user IO is received.

Figure 21:
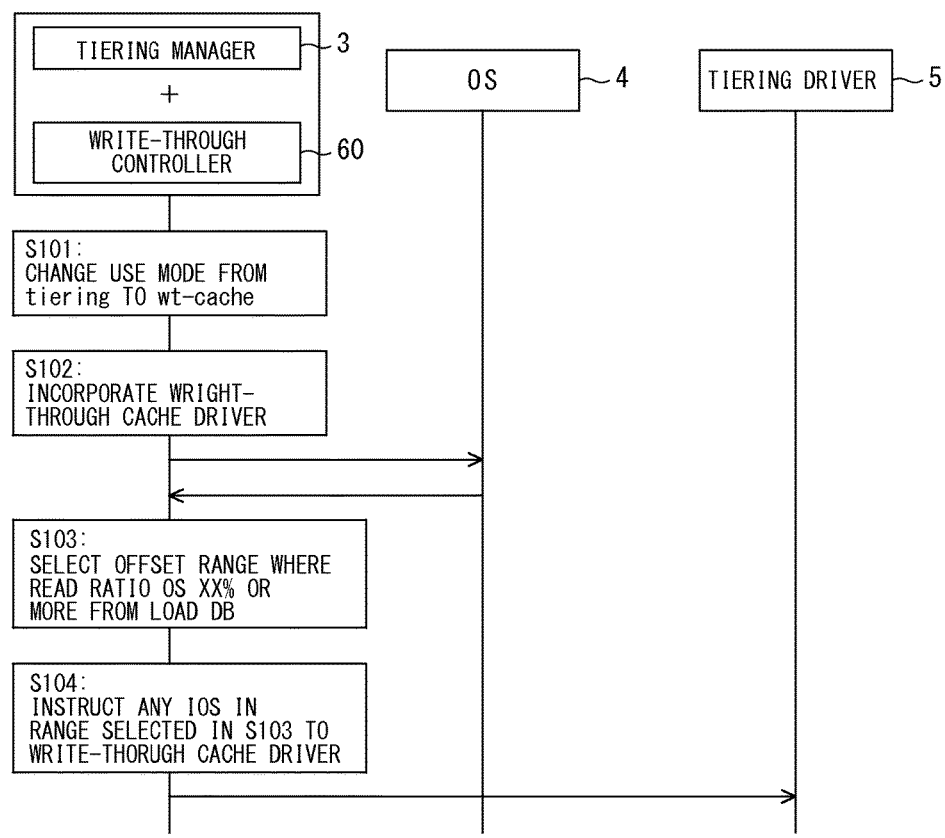
FIG. 21 is a diagram illustrating a transition from the tiering cache mode to the write-through cache mode in the hybrid storage system as an example of an embodiment.
Figure 22:
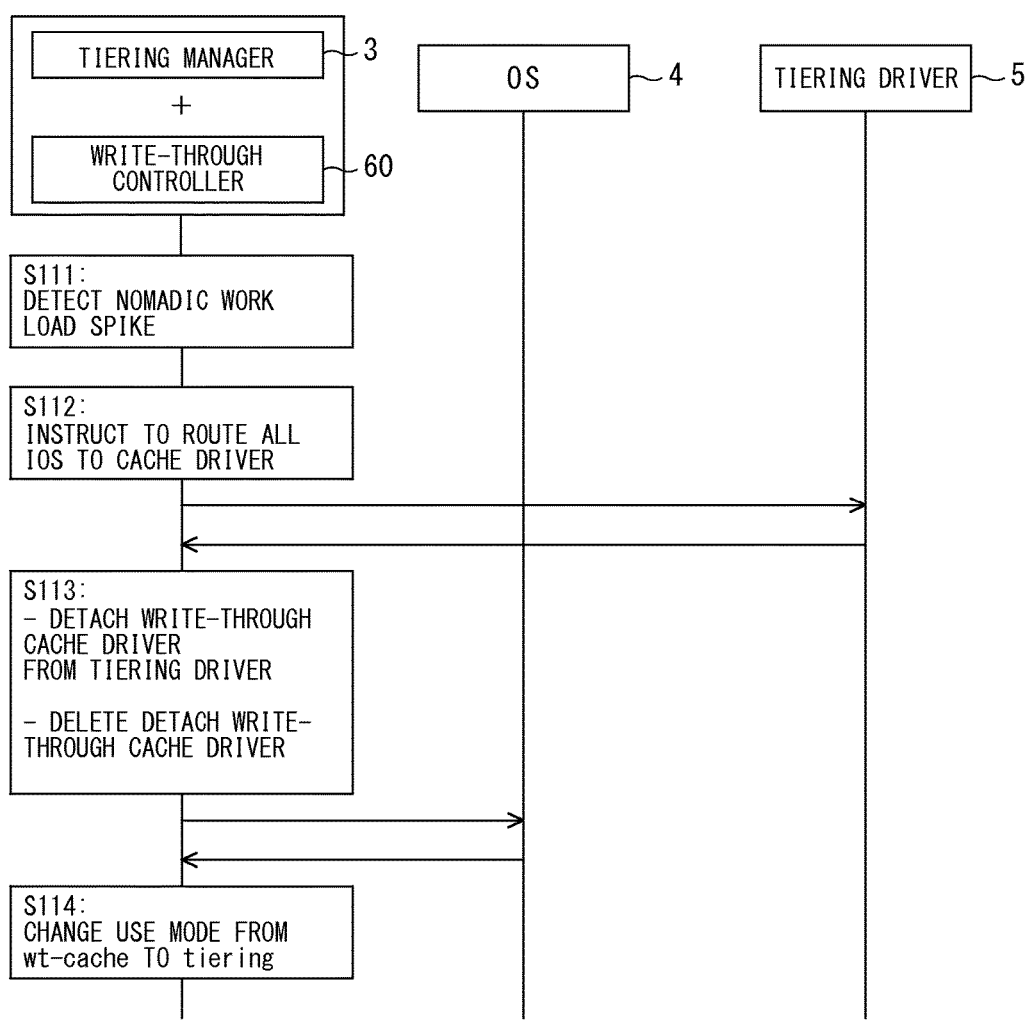
FIG. 22 is a diagram illustrating a transition from the write-through cache mode to the tiering cache mode in the hybrid storage system as an example of an embodiment.
Figure 23:
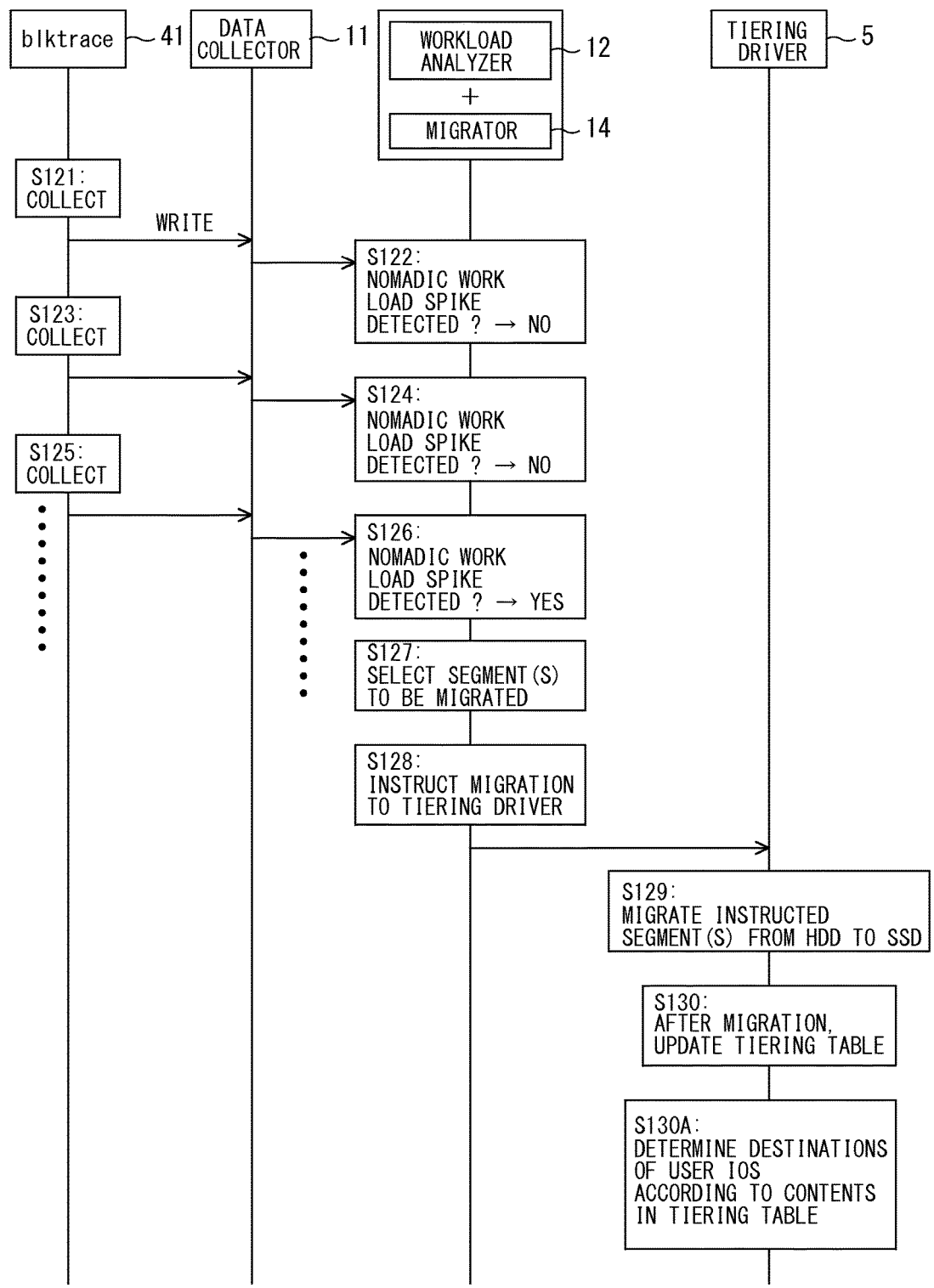
FIG. 23 is a diagram illustrating operations in the tiering cache mode in the hybrid storage system as an example of an embodiment.

Next, with reference to FIGS. 21 to 23, operations in the hybrid storage system 1 as an example of an embodiment are summarized.

FIG. 21 is a diagram illustrating a transition from the tiering cache mode to the write-through cache mode in the hybrid storage system 1 as an example of an embodiment.

In Step S 101, the mode switch 62 in the write-through controller 60 changes the value of the use mode 63 from tiering to wt-cache.

In Step S 102, the mode switch 62 executes the insmod command or the like to incorporate (install) the write-through cache driver 24 to the OS.

In Step S 103, the work load analyzer 12 identifies an offset range (segment) for a segment in the HDD 10 having a read ratio of XX % or more, from the load database.

Then in Step S 104, the mode switch 62 instructs the tiering driver 5 to route IOs for the segment in the HDD 10 with a high read ratio identified by the work load analyzer 12, to the write-through cache driver 24.

FIG. 22 is a diagram illustrating a transition from the write-through cache mode to the tiering cache mode in the hybrid storage system 1 as an example of an embodiment.

In Step S 111, the work load analyzer 12 detects an occurrence of a nomadic work load spike in nomadic work load spike.

Next, in Step S 112, the mode switch 62 instructs the tiering driver 5 to route all IOs to the HDD 10, to the cache driver 6.

In Step S 113, the mode switch 62 detaches the write-through cache driver 24 from the tiering driver 5, by executing the rmmod command, for example, and, deletes the write-through cache driver 24 from the OS 4.

In Step S 114, the mode switch 62 in the write-through controller 60 changes the value of the use mode 63 from wt-cache to tiering.

FIG. 23 is a diagram illustrating operations in the tiering cache mode in the hybrid storage system 1 as an example of an embodiment.

In Step S 121, the blktrace command 41 is executed by the data collector 11, and the IO load values of the HDD 10 are stored in the load database 15.

In Step S 122, the work load analyzer 12 determines that no nomadic work load spike is occurring, by referring to the load database 15 where the results of the blktrace command 41 executed in Step S 121 are stored.

In Step S 123, the blktrace command 41 is executed by the data collector 11, and the IO load values of the HDD 10 are stored in the load database 15.

In Step S 124, the work load analyzer 12 determines that no nomadic work load spike is occurring, by referring to the load database 15 where the results of the blktrace command 41 executed in Step S 123 are stored.

In Step S 125, the blktrace command 41 is executed by the data collector 11, and the IO load values of the HDD 10 are stored in the load database 15.

In Step S 126, the work load analyzer 12 determines that a nomadic work load spike occurs, by referring to the load database 15 where the results of the blktrace command 41 executed in Step S 125 are stored.

In Step S 127, the work load analyzer 12 identifies segment(s) to which data in the HDD 10 is to be migrated, using the load database 15.

In Step S 128, the migrator 14 instructs the tiering driver 5 to migrate data in the segment(s) identified in Step S 127 to the tiering SSD 9.

In Step S 129, the tiering driver 5 migrates the data in the segment(s) indicated in Step S 128, from the HDD 10 to the tiering SSD 9.

In Step S 130, the tiering driver 5 updates an entry for the segment, data of which has been migrated in Step S 128, in the tiering table 22.

In Step S 130A, the tiering driver 5 appropriately routes user IOs to either the tiering SSD 9 or the HDD 10, in accordance with the entries in the tiering table 22. Specifically, the tiering driver 5 routes user IOs to the segment, data of which has been migrated in Step S 128, to the tiering SSD 9.

(C) Advantageous Effects

In accordance with the technique in the present disclosure, in the hybrid storage system 1, the cost (time) for migrating a nomadic work load spike to the SSD 9 exceeds its duration, that nomadic work load spike is dynamically migrated to the SSD 9.

Here, in the hybrid storage system 1, since the SSD 9 and the HDD 7 forms a tiered storage, no writeback of a dirty block occurs for freeing a block in the SSD 9. In other words, once data is staged to the SSD 9, no writeback load is generated. As a result, even if a nomadic work load spike emerges, the SSD 9 can be employed efficiently.

Further, in the hybrid storage system 1, when the work load analyzer 12 detects disappearance of a continuous nomadic work load spike, the mode switch 62 switches the operation mode such that the tiering SSD 9 is operated in the write-through cache. When the tiering SSD 9 is in the write-through cache mode, all data to be written is also written to the HDD and hence no dirty block is incurred.

Furthermore, in response to receiving a write IO command from a host (not illustrated) that is a higher-level apparatus, the hybrid storage system 1 can return a write IO response to the higher-level apparatus, more quickly than a storage apparatus employing the write-back scheme.

Further, in the hybrid storage system 1, the work load analyzer 12 monitors whether any continuous nomadic work load spike arises. Hence, when a continuous nomadic work load spike arises, the tiering SSD 9 can be immediately switched to the tiering cache mode, thereby enabling migration of data related to the continuous nomadic work load spike to the tiering SSD 9.

As described above, in the hybrid storage system 1, the tiering SSD 9 can be operated in the tiering cache mode when a continuous nomadic work load spike arises. The tiering SSD 9 can be used in the write-through mode when no continuous nomadic work load spike arises.

Therefore, it is possible to make full use of the tiering SSD 9, thereby fully utilizing the performance of the tiering SSD 9 as much as possible.

(D) Miscellaneous

Note that the present disclosure is not restricted to the embodiments described above, and various modifications may be made without departing from the spirit of the present disclosure.

For example, although volumes are divided into 1-GB segments in an example of an embodiment described above, the size of divided segments may be suitably modified.

Although the hybrid storage system 2 includes the HDD 7, the cache SSD 8 as a write-back cache, and the tiering SSD 9 in an example of the above-described embodiment, only the HDD 7 may be provided without the write-back cache SSD 8.

Additionally, the hybrid storage system 2 of an example of the above-described embodiment includes discrete SSDs as the tiering SSD 9 and the write-back cache SSD 8. However, a single SSD may be partitioned into multiple regions, and one of the partitioned regions may be used as the tiering SSD 9 and another one may be used as the write-back cache SSD 8.

Furthermore, the first storage device is described as a HDD and the second storage device that is faster than the first storage device is described as an SSD in the above description. The first storage device and the second storage device, however, may be devices in any other types, as long as the second storage device is faster than the first storage device.

Further, although the OS 54 running on the information processing apparatuses 2 is Linux in an example of an embodiment described above, other UNIX® operating systems or other OSs in different architecture may also be used. If a different OS is used, corresponding commands of that OS are used. For example, if the OS 54 is Windows® Operating System, the IO count can be collected using a corresponding Windows command.

It is noted that the configurations and operations of the hybrid storage system 1 which have been described may be omitted or may be combined as appropriate if necessary. In other words, the components and functions described above may be appropriately selected or combined together such that the functions of the disclosed technique are achieved.

Further, in an example of an embodiment described above, the order of the steps in the flows may be modified.

Further, the steps in flowcharts described above may be combined in the hybrid storage system 1.

The disclosure assists in making full use of a faster storage device provided in a storage apparatus.

All examples and conditional language recited herein are intended for the pedagogical purposes of aiding the reader in understanding the invention and the concepts contributed by the inventor to further the art, and are not to be construed as limitations to such specifically recited examples and conditions, nor does the organization of such examples in the specification relate to a showing of the superiority and inferiority of the invention. Although one or more embodiments of the present inventions have been described in detail, it should be understood that the various changes, substitutions, and alterations could be made hereto without departing from the spirit and scope of the invention.

What is claimed is:

1. A storage apparatus comprising:
    a first storage device;
    a second storage device having an access speed higher than an access speed of the first storage device;
    a write-through cache driver for employing the second storage device as a write-through cache for the first storage device; and
    a processor configured to:
        monitor a write access load for the first storage device;
        compare the write access load for the first storage device monitored in the monitoring, with a load threshold;
        incorporate the write-through cache driver, and cause write access target data to be written into the first and second storage devices, when it is determined in the comparison that the write access load for the first storage device does not exceed the load threshold, and
        cause the write access target data to be written into the first storage device, when it is determined in the comparison that the write access load for the first storage device exceeds the load threshold, wherein
    when it is determined in the comparison that the write access load for the first storage device does not exceed the load threshold, the processor causes the target data for a region among regions in the first storage device where a ratio of a read access load to a total access load does not exceed a predetermined value, to be written into the first and second storage devices, and
    when a time period for migrating tiered migration candidate segments between tiers is less than an average life expectancy of a state where the write access load for the first storage device exceeds the load threshold, the processor causes the write-through cache driver to be deleted.

2. The storage apparatus according to claim 1, wherein when it is determined in the comparison that the write access load for the first storage device has exceeded the load threshold for at least a certain time duration, the processor causes the write access target data to be written into the first storage device.

3. The storage apparatus according to claim 1, wherein when it is determined in the comparison that the write access load for the first storage device exceeding the load threshold reduces to the load threshold or lower, the processor causes target data that has been written in the second storage device, if any, to be written back into the first storage device.

4. The storage apparatus according to claim 1, wherein the storage apparatus further comprises a third storage device having an access speed higher than the access speed of the first storage device, and
    the third storage device is controlled by a driver that controls the first storage device.

5. A method of controlling a storage apparatus comprising a first storage device, and a second storage device having an access speed higher than an access speed of the first storage device, the method comprising:
    monitoring a write access load for the first storage device;
    comparing the write access load for the first storage device monitored in the monitoring, with a load threshold;
    incorporating a write-through cache driver for employing the second storage device as a write-through cache for the first storage device and causing write access target data to be written into the first and second storage devices, when it is determined in the comparison that the write access load for the first storage device does not exceed the load threshold, and
    causing the write access target data to be written into the first storage device, when it is determined in the comparison that the write access load for the first storage device exceeds the load threshold, wherein
    when it is determined in the comparison that the write access load for the first storage device does not exceed the load threshold, causing the target data for a region among regions in the first storage device where a ratio of a read access load to a total access load does not exceed a predetermined value, to be written into the first and second storage devices, and
    when a time period for migrating tiered migration candidate segments between tiers is less than an average life expectancy of a state where the write access load for the first storage device exceeds the load threshold, causing the write-through cache driver to be deleted.

6. The method according to claim 5, wherein when it is determined in the comparison that the write access load for the first storage device has exceeded the load threshold for at least a certain time duration, causing the write access target data to be written into the first storage device.

7. The method according to claim 5, wherein when it is determined in the comparison that the write access load for the first storage device exceeding the load threshold reduces to the load threshold or lower, causing target data that has been written in the second storage device, if any, to be written back into the first storage device.

8. The method according to claim 5, wherein the storage apparatus further comprises a third storage device having an access speed higher than the access speed of the first storage device, and
    the third storage device is controlled by a driver that controls the first storage device.

9. A non-transitory computer-readable storage medium storing a program for controlling a storage apparatus comprising a first storage device, and a second storage device having an access speed higher than an access speed of the first storage device, the program making a processor:
    monitor a write access load for the first storage device;
    compare the write access load for the first storage device monitored in the monitoring, with a load threshold;
    incorporate a write-through cache driver for employing the second storage device as a write-through cache for the first storage device, and cause write access target data to be written into the first and second storage devices, when it is determined in the comparison that the write access load for the first storage device does not exceed the load threshold, and cause the write access target data to be written into the first storage device, when it is determined in the comparison that the write access load for the first storage device exceeds the load threshold, wherein when it is determined in the comparison that the write access load for the first storage device does not exceed the load threshold, the program makes the processor cause the target data for a region among regions in the first storage device where a ratio of a read access load to a total access load does not exceed a predetermined value, to be written into the first and second storage devices, and when a time period for migrating tiered migration candidate segments between tiers is less than an average life expectancy of a state where the write access load for the first storage device exceeds the load threshold, the program makes the processor cause the write-through cache driver to be deleted.

10. The non-transitory computer-readable storage medium according to claim 9, wherein when it is determined in the comparison that the write access load for the first storage device has exceeded the load threshold for at least a certain time duration, the program makes the processor cause the write access target data to be written into the first storage device.

11. The non-transitory computer-readable storage medium according to claim 9, wherein when it is determined in the comparison that the write access load for the first storage device exceeding the load threshold reduces to the load threshold or lower, the program makes the processor cause target data that has been written in the second storage device, if any, to be written back into the first storage device.

12. The non-transitory computer-readable storage medium according to claim 9, wherein the storage apparatus further comprises a third storage device having an access speed higher than the access speed of the first storage device, and the third storage device is controlled by a driver that controls the first storage device.

* * * * *